United States Patent
Goodall et al.

(10) Patent No.: US 7,456,596 B2
(45) Date of Patent: Nov. 25, 2008

(54) AUTOMATIC RADIO SITE SURVEY USING A ROBOT

(75) Inventors: David S. Goodall, Randwick (AU); Brian Hart, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 11/208,091

(22) Filed: Aug. 19, 2005

(65) Prior Publication Data

US 2007/0042716 A1    Feb. 22, 2007

(51) Int. Cl.
*B25J 5/00*    (2006.01)

(52) U.S. Cl. .............................. 318/568.12; 318/568.11

(58) Field of Classification Search .................. 455/39, 455/67.11, 456.1, 422.1, 403; 318/568.12, 318/568.11, 568.1, 567, 560
See application file for complete search history.

(56) References Cited

U.S. PATENT DOCUMENTS

| | | | |
|---|---|---|---|
| 4,638,445 A | 1/1987 | Mattaboni | 364/513 |
| 5,124,918 A | 6/1992 | Beer et al. | 364/424.02 |
| 5,144,685 A | 9/1992 | Nasar et al. | 382/48 |
| 5,324,948 A | 6/1994 | Dudar et al. | 250/379 |
| 5,758,298 A | 5/1998 | Guldner | 701/23 |
| 5,770,913 A | 6/1998 | Mizzi | 310/328 |
| 5,774,632 A | 6/1998 | Kaske | 395/22 |
| 5,911,767 A | 6/1999 | Garibotto et al. | 701/28 |
| 5,936,240 A | 8/1999 | Dudar et al. | 250/253 |
| 6,108,597 A | 8/2000 | Kirchner et al. | 701/23 |
| 6,112,996 A | 9/2000 | Matsuo | 235/492 |
| 6,134,486 A | 10/2000 | Kanayama | 701/23 |
| 6,162,171 A | 12/2000 | Ng et al. | 600/141 |
| 6,374,155 B1 | 4/2002 | Wallach et al. | 700/245 |
| 6,414,457 B1 | 7/2002 | Agrawal et al. | 318/568.12 |
| 6,496,755 B2 | 12/2002 | Wallach et al. | 700/245 |
| 6,505,045 B1 | 1/2003 | Hills et al. | 455/449 |
| 6,539,284 B2 | 3/2003 | Nourbakhsh et al. | 700/245 |
| 6,581,000 B2 | 6/2003 | Hills et al. | 701/207 |

(Continued)

FOREIGN PATENT DOCUMENTS

DE      199 20 587 A1    11/2000
WO     WO 2005/055628 A1    6/2005

OTHER PUBLICATIONS

P. Blaer and P.K. Allen, "TopBot: Automated Network Topology Detection With a Mobile Robot," Proceedings of the 2003 IEEE International Conference on Robotics & Automation, Taipei, Tawain, Sep. 14-19, 2003.

(Continued)

*Primary Examiner*—Bentsu Ro
*Assistant Examiner*—David S Luo
(74) *Attorney, Agent, or Firm*—Dov Rosenfeld; Inventek

(57) ABSTRACT

A method, apparatus, and carrier medium carrying computer readable code. The apparatus includes a mobile robot arranged in operation to traverse an area, a first transceiver for a wireless network mounted on the robot and arranged in operation to communicate with a second transceiver to effect radio measurement operations for determining at each of a plurality of locations covering the area a measure indicative of the path loss between the first and second transceivers, and a location determining system at least a component of which is mounted on the robot and arranged in operation to determine the location of the first transceiver in the area.

30 Claims, 8 Drawing Sheets

U.S. PATENT DOCUMENTS

| | | | |
|---|---|---|---|
| 6,604,022 B2 | 8/2003 | Parker et al. | 700/258 |
| 6,615,108 B1 | 9/2003 | Peless et al. | 700/245 |
| 6,636,737 B1 | 10/2003 | Hills et al. | 455/450 |
| 6,680,924 B2 | 1/2004 | Hills et al. | 370/329 |
| 6,711,148 B1 | 3/2004 | Hills | 370/338 |
| 6,760,645 B2 | 7/2004 | Kaplan et al. | 700/245 |
| 6,760,647 B2 | 7/2004 | Nourbakhsh et al. | 700/245 |
| 6,781,338 B2 | 8/2004 | Jones et al. | 318/567 |
| 6,809,490 B2 | 10/2004 | Jones et al. | 318/568.12 |
| 6,809,520 B1 | 10/2004 | Nelson | 324/329 |
| 6,836,701 B2 | 12/2004 | McKee | 700/245 |
| 6,853,880 B2 | 2/2005 | Sakagami et al. | 700/259 |
| 6,883,201 B2 | 4/2005 | Jones et al. | 15/319 |
| 6,885,912 B2 | 4/2005 | Peless et al. | 700/245 |
| 6,907,229 B2 * | 6/2005 | Shpak | 455/69 |
| 2001/0037163 A1 | 11/2001 | Allard | 700/245 |
| 2001/0047895 A1 | 12/2001 | De Fazio et al. | 180/22 |
| 2002/0011367 A1 | 1/2002 | Kolesnik | 180/168 |
| 2002/0021219 A1 | 2/2002 | Edwards | 340/573.1 |
| 2002/0060542 A1 * | 5/2002 | Song et al. | 318/568.12 |
| 2002/0095239 A1 | 7/2002 | Wallach et al. | 700/245 |
| 2002/0173877 A1 | 11/2002 | Zweig | 700/245 |
| 2002/0183895 A1 | 12/2002 | Kaplan et al. | 700/245 |
| 2002/0189871 A1 | 12/2002 | Won | 180/9.32 |
| 2003/0009261 A1 | 1/2003 | Parker et al. | 700/258 |
| 2003/0025472 A1 | 2/2003 | Jones et al. | 318/568.12 |
| 2003/0055532 A1 | 3/2003 | Sakagami et al. | 700/245 |
| 2003/0089267 A1 | 5/2003 | Ghorbel et al. | 104/138.1 |
| 2003/0137268 A1 | 7/2003 | Papanikolopoulos et al. | 318/568.11 |
| 2003/0176986 A1 | 9/2003 | Dietsch et al. | 702/150 |
| 2003/0208304 A1 | 11/2003 | Peless et al. | 700/245 |
| 2003/0212472 A1 | 11/2003 | Mckee | 700/245 |
| 2003/0216834 A1 | 11/2003 | Allard | 700/245 |
| 2004/0029558 A1 * | 2/2004 | Liu | 455/404.2 |
| 2004/0030448 A1 | 2/2004 | Solomon | 700/245 |
| 2004/0030449 A1 | 2/2004 | Solomon | 700/245 |
| 2004/0030450 A1 | 2/2004 | Solomon | 700/245 |
| 2004/0030451 A1 | 2/2004 | Solomon | 700/245 |
| 2004/0030570 A1 | 2/2004 | Solomon | 705/1 |
| 2004/0030571 A1 | 2/2004 | Solomon | 705/1 |
| 2004/0032363 A1 | 2/2004 | Schantz et al. | 342/127 |
| 2004/0049877 A1 | 3/2004 | Jones et al. | 15/319 |
| 2004/0068351 A1 | 4/2004 | Solomon | 701/24 |
| 2004/0068415 A1 | 4/2004 | Solomon | 705/1 |
| 2004/0068416 A1 | 4/2004 | Solomon | 705/1 |
| 2004/0076324 A1 | 4/2004 | Burl et al. | 382/153 |
| 2004/0111184 A1 | 6/2004 | Chiappetta et al. | 700/245 |
| 2004/0134336 A1 | 7/2004 | Solomon | 89/1.11 |
| 2004/0134337 A1 | 7/2004 | Solomon | 89/1.11 |
| 2004/0173116 A1 | 9/2004 | Ghorbel et al. | 104/138.2 |
| 2004/0187249 A1 | 9/2004 | Jones et al. | 15/319 |
| 2004/0200505 A1 | 10/2004 | Taylor et al. | 134/18 |
| 2004/0204792 A1 | 10/2004 | Taylor et al. | 700/245 |
| 2004/0207355 A1 | 10/2004 | Jones et al. | 318/568.12 |
| 2004/0211444 A1 | 10/2004 | Taylor et al. | 134/18 |
| 2004/0236468 A1 | 11/2004 | Taylor et al. | 700/245 |
| 2004/0244138 A1 | 12/2004 | Taylor et al. | 15/319 |
| 2005/0000543 A1 | 1/2005 | Taylor et al. | 134/18 |
| 2005/0010331 A1 | 1/2005 | Taylor et al. | 700/245 |
| 2005/0038562 A1 | 2/2005 | Bash et al. | 700/245 |
| 2005/0046608 A1 | 3/2005 | Schantz et al. | 342/127 |
| 2005/0065652 A1 | 3/2005 | Sakagami et al. | 700/245 |
| 2005/0113990 A1 | 5/2005 | Peless et al. | 701/23 |
| 2005/0132527 A1 | 6/2005 | Pedlar et al. | 15/340.3 |

OTHER PUBLICATIONS

H. Blaasvaer, P. Pirjanian and H.I. Christensen. "AMOR-An Autonomous Mobile Robot Navigation System." 1994 IEEE International Conference on Systems, Man, and Cybernetics, 1994, 'Humans, Information and Technology', vol. 3, Oct. 2-5, 1994 pp. 2266-2271.

P. Wertz, G. Wölfle, R. Hoppe, D. Zimmermann and F.M. Landstorfer. "Enhanced Localization Technique within Urban and Indoor Environments based on Accurate and Fast Propagation Models." European Cooperation in the Field of Scientific and Technical Research, Cost 273, Guildford, UK, Jan. 17-18, 2002.

Datasheet for "NavMaster III." Downloaded Jul. 5, 2005. Cybermotion, Inc., Roanoke, VA. Available online at: http://www.cybermotion.com/datasheets/navmast3.pdf.

"The "A,B,G's" of Wi-Fi Site Surveys." Downloaded Jul. 28, 2005. Ekahau, Inc., Saratoga, CA, May 2004. Available online at: http://www.ekahau.com/?id=4600.

"Ekahau Site Survey" Datasheet. Downloaded Jul. 28, 2005. Ekahau, Inc., Saratoga, CA. Available online at: http://www.ekahau.com/?id=4600.

R. Hoppe, G. Wölfle, P. Wertz and F.M. Landstorfer. "Advanced Ray-Optical Wave Propagation Modelling for Indoor Environments Including Wireband Properties." European Transactions on Telecommunications (ETT), Jan./Feb. 2003 (No. 01/2003), Jan. 2003. Available online at: http://www.awe-com.de/Publications/ew2002b.pdf.

G. Wölfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005.

Helium Networks "Technology." Downloaded Mar. 9, 2005 from heliumnetworks.com, Helium Networks, Inc., Pittsburgh, PA.

A. Hills, J. Schlegel and B. Jenkins. "Estimating Signal Strengths in the Design of an Indoor Wireless Network." IEEE Transactions on Wireless Communications, vol. 3, Issue 1, Jan. 2004 pp. 17-19.

Jane Yung-jen Hsu and Liang-Sheng Hwang. "A Graph-Based Exploration Strategy of Indoor Environments by an Autonomous Mobile Robot," 1998 IEEE International Conference on Robotics and Automation, 1998, vol. 2, May 16-20, 1998 pp. 1262-1268.

L.M. Ni, Y. Liu, Y.C. Lau and A.P. Patil. "Landmarc: Indoor Location Sensing Using Active RFID." ACM Wireless Networks, (WINET), vol. 10, Issue 6, Nov. 2004, pp. 701-710.

"PatrolBot" Information Sheet. Downloaded Jul. 5, 2005. MobileRobots, Amherst, NH. Available online at: http://www.activrobots.com/ROBOTS/patrolbot.html.

"Pioneering Near Field Electromagnetic Ranging (NFER) Technology." Downloaded Aug. 18, 2005 from www.q-trak.com. Q-Track, Inc., Huntsville, Alabama.

Alex Hills and Jon Schlegel. "Rollabout: A Wireless Design Tool." IEEE Communications, vol. 42, No. 2, pp. 132-138, Feb. 2004.

Preliminary report on counterpart PCT Application No. PCT/US2006/030750, mailed Feb. 28, 2008.

* cited by examiner

AUTOMATIC RADIO SITE SURVEY USING A ROBOT

BACKGROUND

The present invention is related to wireless networks, and in particular to a method and apparatus for carrying out a radio site survey.

Wireless networks such as wireless local area networks are becoming ubiquitous. For example, WLANs that conform to the IEEE 802.11 standard are found everywhere. Deployment of WLANs includes selection of locations to place access points (APs), frequency assignment, and determining of transmit powers. Properly solving this is called "radio planning." Radio planning requires site surveys to determine the propagation properties of the environment. By a site survey is meant knowledge of path loss data, including path loss data from AP-to-AP, from AP-to-client, and from client-to-client for APs and clients whose location is known. By path loss data is meant actual path loss, or similar data, e.g., data from which the path loss can be determined. This similar data includes, for example, the received signal strength for a signal whose transmit power is known.

In addition to radio planning, path loss data also provides a mechanism for determining the location of wireless stations, e.g., the location of rogue access points.

Although AP-to-AP path losses can be obtained automatically, the other forms of path losses usually require inaccurate prediction software, or expensive human intervention, e.g., in a site survey/walkabout.

Path loss prediction software is available, for example, from Wireless Valley Communications, Inc. (Austin, Tex.), and others. See, for example, ProMan—Prediction of Wavepropagation (Path Loss & Wideband Parameters) by AWE Communications, Gärtringen, Germany. See also Constantino Perez-Vega, Jose Luis García G and José Miguel López Higuera, "A simple and efficient model for indoor path-loss prediction," Meas. Sci. Technol. vol. 8, pp. 1166-1173, 1997. G. Wölfle, R. Wahl, P. Wertz, P. Wildbolz, F. Landstorfer "Dominant Path Prediction Model for Indoor Scenarios, German Microwave Conference (GeMIC) 2005, Ulm (Germany), April 2005. R. Hoppe, P. Wertz, F. M. Landstorfer, and G. Wölfle: "Advanced Ray Optical Wave Propagation Modelling for Urban and Indoor Scenarios Including Wideband Properties," European Transactions on Telecommunications (ETT), January/February 2003 (Number 01/2003), January 2003. See also Hills, A.; Schlegel, J.; Jenkins, B.: "Estimating signal strengths in the design of an indoor wireless network," IEEE Transactions on Wireless Communications, Volume 3, Issue 1, January 2004 Page(s): 17-19. See also U.S. Pat. No. 6,680,924 titled "Method for estimating signal strengths."

It is known, however, that prediction software can produce significant errors. The accuracy of the predictions depends on the accuracy of the path loss model used, and on the knowledge of the architecture in which data is to be predicted. Actual measurements clearly are more accurate.

To perform a radio site survey typically involves obtaining actual walkabout data by having a person walking about the area of interest. Such a person may or may not have accurate location information. An example of how walkabout data without explicit knowledge of location is used in Cisco's Wireless LAN Solution Engine (WLSE), by Cisco Systems, Inc., related to the assignee of the present invention.

A radio site survey may also be obtained using fake walkabout data obtained from extrapolating AP-to-AP data, as per Cisco's Wireless LAN Solution Engine (WLSE), by Cisco Systems, Inc., related to the assignee of the present invention.

See also U.S. Pat. No. 6,680,924 to Hills et al., titled METHOD FOR ESTIMATING SIGNAL STRENGTHS.

U.S. Pat. No. 6,581,000 to Hills et al., titled POSITION LOCATION SYSTEM AND METHOD describes a system for determining a position of a user, e.g., a person carrying a laptop that includes a wireless transceiver for obtaining walkabout data. The system includes a distance sensor in communication with a position-tracking device. The distance sensor is for detecting movement by the user, and the position-tracking device is for determining the position of the user based on detection of movement by the user and a relative change in direction input from the user. This system provides for a walkabout that includes position determining.

Hills, A. and J. Schlegel, "Rollabout: A Wireless Design Tool," IEEE Communications, vol. 42, no. 2, pp. 132-138, February 2004, describes a semi-automated design tool called "Rollabout" that partially automates the collection and interpretation of site survey data. A rolling cart that contains a radio transceiver is pushed around an indoor area where a site survey is desired. When pushed around on the rolling cart, the system collects data from APs and automatically creates a coverage map of the region. Using this data, the described system also helps define optimal AP placement and determine the best frequency assignments for APs.

While Rollabout does go part of the way towards automating the obtaining of a site survey, Rollabout still requires a human to walk about the area. Furthermore, as described in the above-mentioned Hills et al. IEEE paper, Rollabout only measures AP-client path losses, not client-client. If it is also desired to measure client to client measurements, manually walking around involves a very large number of measurements. For example, if the number of AP-to-client measurements grows as O(N) with area, then the number of client-to-client measurements initially grows as $O(N^2)$ with area, which strongly motivates a fully automatic method that does not require a human to walk-about.

Thus there is a need in the art for an automatic mechanism for obtaining AP-to-client and client-to-client path losses. By automatic is meant a method that does not require a human to walk about and obtain the measurements.

SUMMARY

Described herein are a method, an apparatus, and a carrier medium carrying computer readable code. These are each to obtain radio measurements, e.g., for a site survey using a mobile robot on which is mounted a radio transceiver and at least a component of a location determining system, the location determining system arranged in operation to determine the location of the robot.

One embodiment is an apparatus comprising a mobile robot arranged in operation to traverse an area, a first transceiver for a wireless network mounted on the robot and arranged in operation to communicate with a second transceiver to effect radio measurement operations including determining a measure indicative of the path loss, between the first and second transceivers and a location determining system at least a component of which is mounted on the robot and arranged in operation to determine the location of the first transceiver in the area.

In one embodiment of the apparatus, the mobile robot is a mobile robot that includes a housing infrastructure including a chassis, a power subsystem arranged in operation to provide the energy to power the robot; a motive subsystem operative to propel the robot for radio measurement operations, and a control module operative to control the robot to effect radio measurement operations via the transceiver and the location determining module. The control module is coupled to the first transceiver and to at least the part of the location determining system that is mounted on the robot. In one embodiment, the control module is operative such that an operator can remotely control the robot to traverse a set of locations in the area and carry out the radio measurement operations for the plurality of locations.

In another embodiment, the mobile robot is an autonomous robot that further includes a sensor subsystem of one or more sensors coupled to the control module and operative in combination with the control module to navigate around a stationary object or obstacle encountered by the robot. The control module is further operative such that the mobile robot can operate autonomously to autonomously traverse a set of locations in the area and autonomously carry out the radio measurement operations for the plurality of locations.

Also described herein is a method operative in a wireless network comprising providing a mobile robot arranged in operation to traverse a plurality of locations in an area, the mobile robot having a first transceiver for the wireless network mounted thereon, the first transceiver arranged in operation to communicate with a second transceiver to effect radio measurement operations including determining a measure indicative of the path loss between the first and second transceivers. The robot further includes the mobile robot further including at least a component of a location determining system configured in operation to determine the location of the first transceiver in the area. The method further includes providing the part of the location determining system not mounted on the robot. The method further includes, for a plurality of locations in the area, carrying out the radio measurement operations.

Also described herein is apparatus operative in a wireless network. The apparatus includes a first mobile robot arranged in operation to traverse an area. The first mobile robot means including a first transceiver mounted on the first mobile robot means arranged in operation to communicate with a second transceiver to effect radio measurement operations including determining a measure indicative of the path loss between the first and second transceivers; the first mobile robot means further including at least part of means for determining the location of the first transceiver in the area.

Also described herein is a carrier medium carrying computer readable code to cause one or more processors to implement a method, the method including causing a first mobile robot to traverse a first plurality of locations in an area. The first mobile robot includes a first transceiver mounted thereon, the first transceiver being for the wireless network and arranged in operation to communicate with a second transceiver to effect radio measurement operations including determining a measure indicative of the path loss between the first and second transceivers. The first mobile robot further includes at least a component of a location determining system arranged in operation to determine the location of the first transceiver in the area.

The traversing of the first plurality of locations includes, at each location of the first plurality, carrying out the radio measurement operations, including using the location determining system to determine the location of the first set of locations.

As an example, the methods and apparatuses described herein can be used to traverse a floor that has the wireless network. When the wireless transceiver on the mobile robot is a client station of the wireless network, the methods and apparatuses described herein may be used to automatically obtain AP-to-client path loss measurements throughout the floor. Furthermore, two or more instances of the combination of robot, radio transceiver, and location determining system can be used to obtain client-to-client path loss measurements throughout the floor.

A site survey so obtained might be more accurate than using prior art methods because it is based on actual measurements. It furthermore might be more automated. Such a robot-based method might also provide for thorough coverage than human-based site surveying.

DETAILED DESCRIPTION

Described herein is a method and apparatus and software product (e.g., a computer readable carrier medium) for automatically obtaining radio measurements for a site survey using an autonomous robot to traverse an area.

Figure 1:
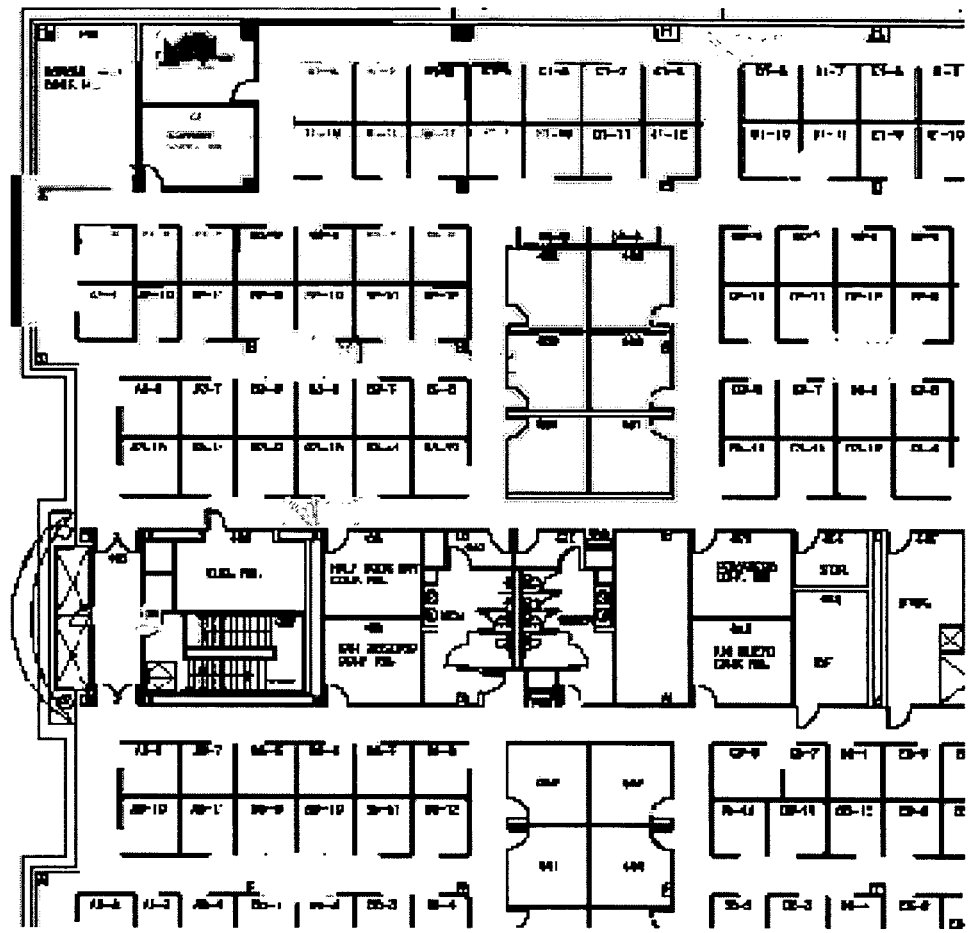
FIG. 1 shows an exemplary floor of a building where a site survey is to be performed.
Figure 2:
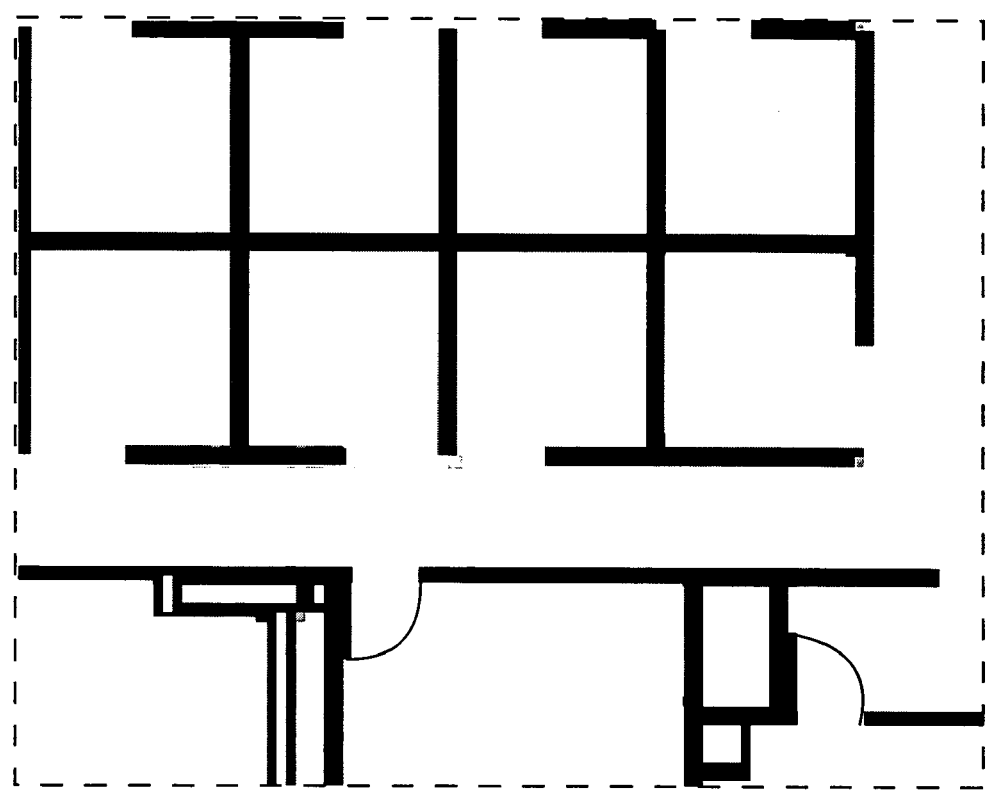
FIG. 2 shows one part of the exemplary floor of FIG. 1, enlarged.

FIG. 1 shows an exemplary floor of a building where a site survey is to be performed. Note that there are many obstacles such as walls and doors. FIG. 2 shows one part of the floor enlarged.

One aspect of the present invention is an apparatus that includes a mobile robot arranged in operation to traverse an area, a location determining system at least a component of which is mounted on the robot and arranged in operation to determine the location of the robot in the area, and a first transceiver for a wireless network arranged in operation to communicate with a second transceiver to determine a measure indicative of the path loss between the first and second transceivers.

The Mobile Robot

One aspect of the invention is to use a robot to move in an area autonomously and automatically. The inventors chose for one embodiment to use the robot design similar to that of the Roomba™, which is a mobile robot embodied as an automated vacuum cleaner available from iRobot Corporation, Burlington, Mass. Of course, the robot used in embodiments of the present invention need not, and typically does not include the cleaning components of Roomba/iRobot system. The Roomba/iRobot system uses a contact sensor to detect a collision between the robot and an obstacle. Contact sensors are also known in the art as "bump sensors." In response to the detection of the collision, the iRobot robot can subsequently adjust the robot's path. The following design details are summaries of the iRobot robot design. For more details, see U.S. Pat. No. 6,883,201 titled AUTONOMOUS FLOOR-CLEANING ROBOT; U.S. Pat. No. 6,809,490 titled METHOD AND SYSTEM FOR MULTI-MODE COVERAGE FOR AN AUTONOMOUS ROBOT; U.S. Pat. No. 6,781,338 titled METHOD AND SYSTEM FOR ROBOT LOCALIZATION AND CONFINEMENT; U.S. Pat. No. 6,690,134 titled METHOD AND SYSTEM FOR ROBOT LOCALIZATION AND CONFINEMENT; and U.S. Pat. No. 6,594,844 titled ROBOT OBSTACLE DETECTION SYSTEM. The contents of each of these patents are incorporated herein by reference.

Figure 3:
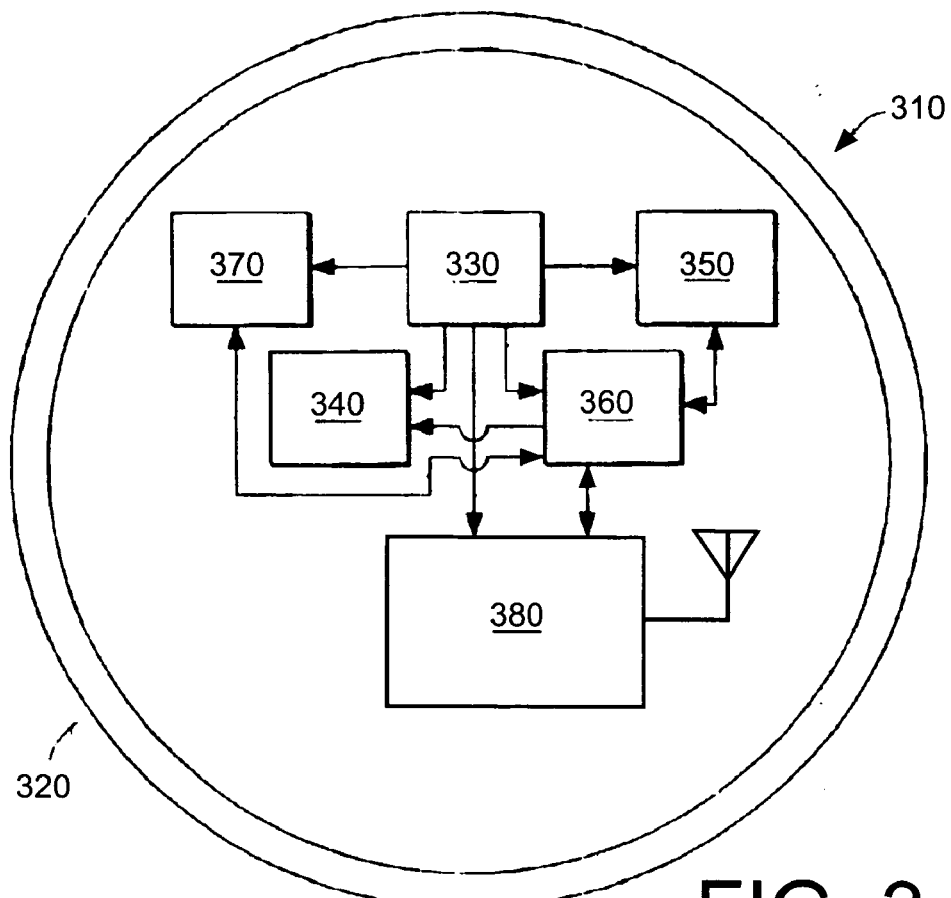
FIG. 3 shows in a schematic representation of one embodiment of an autonomous site-survey robot according to one or more aspects of the present invention.

One embodiment of the autonomous site-survey robot according to the present invention is shown in a schematic representation in FIG. 3, and includes a housing infrastructure 320 including a chassis, a power subsystem 330 arranged in operation to provide the energy to power the autonomous site-survey robot, a motive subsystem 340 operative to propel the autonomous site-survey robot for radio measurement operations, a control module 360 operative to control the autonomous site-survey robot to effect measurement operations via a coupled transceiver 380, e.g., in the form of a wireless station of a WLAN, a coupled location determining module 370 to determine the location of the robot, and a sensor subsystem of one or more sensors 350 that is operative to determine the location of a stationary object or obstacle encountered by the autonomous robot. Further details regarding the operation of one embodiment of the sensor(s) 350, as well as alternative embodiments of sensors having utility in detecting contact with or proximity to stationary objects or obstacles can be found in above-mentioned U.S. Pat. No. 6,809, 490 titled METHOD AND SYSTEM FOR MULTI-MODE COVERAGE FOR AN AUTONOMOUS ROBOT.

In one embodiment, the mobile site-survey robot includes a remote control. The remote control might be, for example, via a wireless link such as a wireless local area network. In one embodiment, the mobile site-survey robot further includes a time scheduling mechanism that is programmable and settable using an included remote control. Note that this feature is already available in the latest version of the Roomba™ cleaning robot, which is a mobile robot embodied as an automated vacuum cleaner available from iRobot Corporation, Burlington, Mass.

Figure 4:
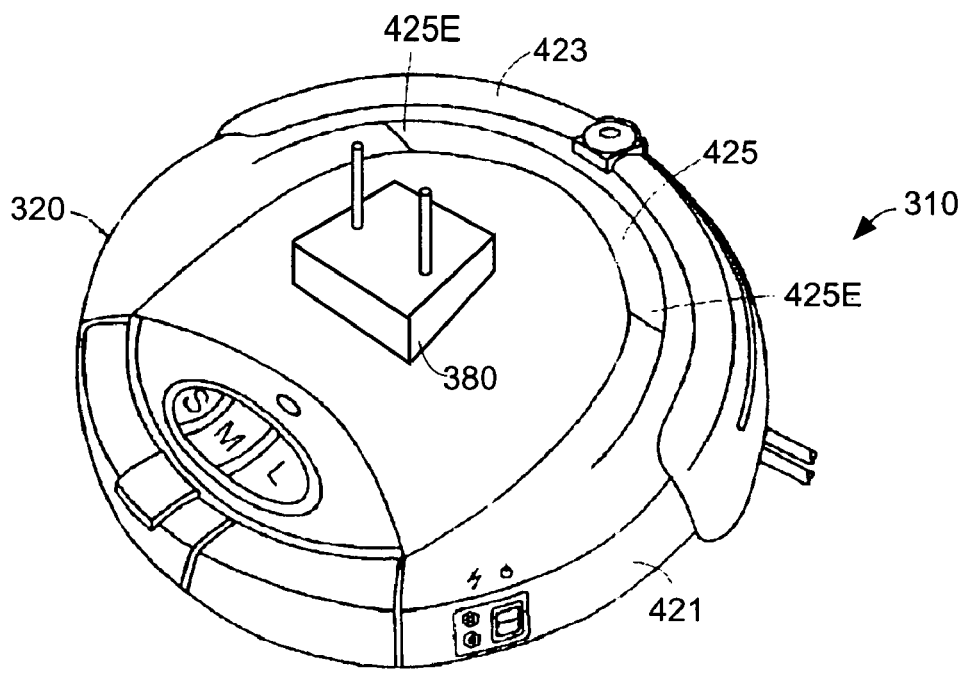
FIG. 4 shows a perspective view of one embodiment of the mobile site-survey robot.

FIG. 4 shows a perspective view of one embodiment of the mobile site-survey robot 310. The housing infrastructure 320 includes a chassis 421 supporting mechanical and electrical components. The chassis 421 has a cover, one or more displaceable bumpers 423, and a carrying handle 425 with ends 425E. The chassis 421 is preferably molded from a material such as plastic as a unitary element that includes a plurality of preformed wells, recesses, and structural members for, inter alia, mounting or integrating elements of the power subsystem 330, the motive subsystem 340, the sensor subsystem 350, the position determining subsystem 370, and the radio transceiver 380, e.g., in the form of a wireless station of a LAN, in combination with the chassis 421. The cover is preferably molded from a material such as plastic as a unitary element that is complementary in configuration with the chassis 421 and provides protection of and access to elements/ components mounted to the chassis 421. The chassis 421 and its cover are detachably integrated in combination by any suitable means, e.g., screws, and in combination, the chassis 421 and cover form a structural envelope of minimal height having a generally cylindrical configuration that is generally symmetrical along the fore-aft axis.

The displaceable bumper(s) 423, which has a generally arcuate configuration, is mounted in movable combination at the forward portion of the chassis 421 to extend outwardly therefrom, i.e., the normal operating position. The mounting configuration of the displaceable bumper is such that the bumper 423 is displaced towards the chassis 421 (from the normal operating position) whenever the bumper 423 encounters a stationary object or obstacle of predetermined mass, i.e., the displaced position, and returns to the normal operating position when contact with the stationary object or obstacle is terminated (due to operation of the control module 360 which, in response to any such displacement of the bumper 423, implements a "bounce" mode that causes the robot 310 to evade the stationary object or obstacle and continue its area coverage routine, e.g., initiate a random—or weighted—random-turn to resume forward movement in a different direction). The mounting configuration of the displaceable bumper 423 comprises a pair of rotatable support members, which are operative to facilitate the movement of the bumper 423 with respect to the chassis 421.

Figure 5:
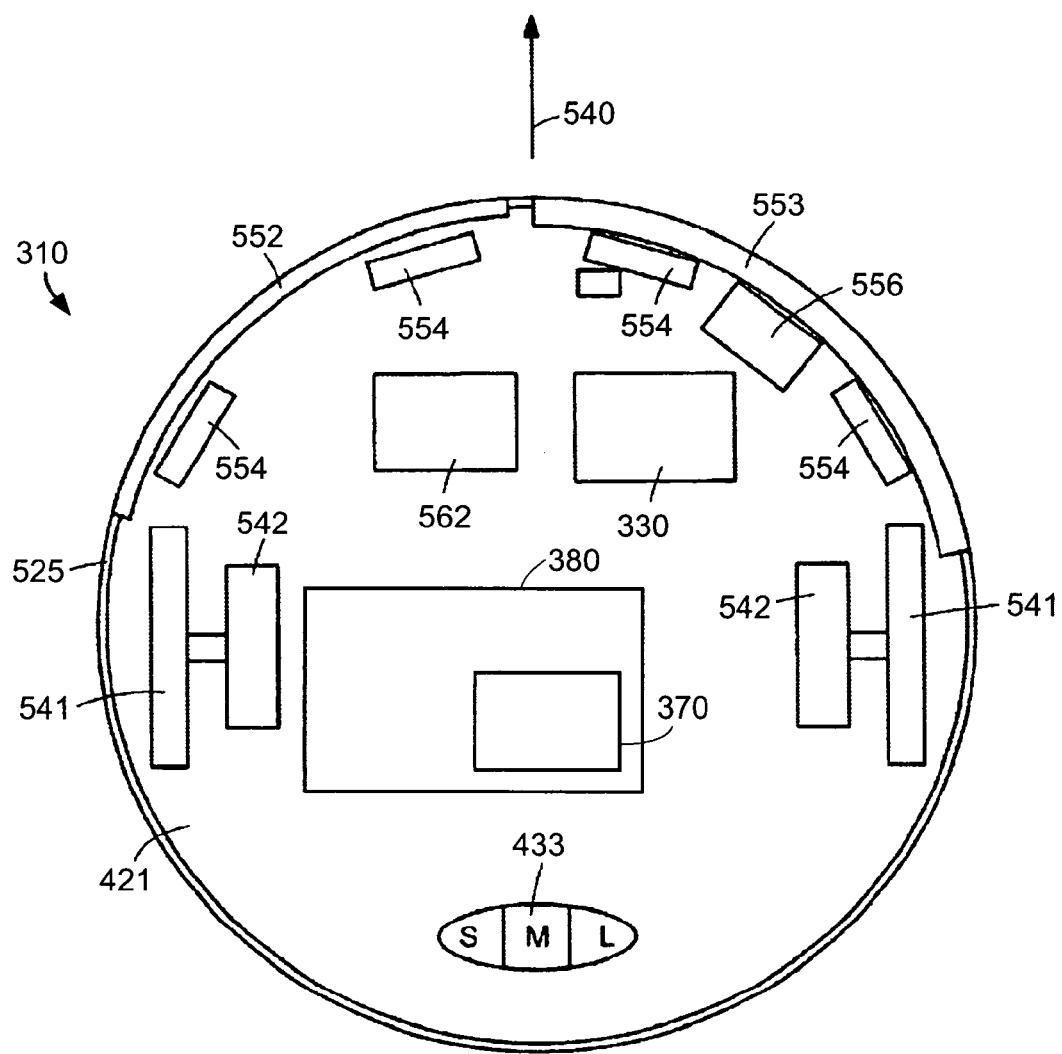
FIG. 5 shows a mobile site-survey robot embodiment that includes housing infrastructure that includes a chassis supporting mechanical and electrical components.

In one embodiment of the present invention, a mobile site-survey robot is designed to provide maximum coverage at an effective coverage rate in a room of unknown geometry. In addition, the perceived effectiveness of the robot is enhanced by the inclusion of patterned or deliberate motion. In addition, in one embodiment, effective coverage requires a control system able to prevent the robot from becoming immobilized in an unknown environment. While the physical structures of mobile robots are known in the art, the components of one exemplary embodiment of the present invention is described herein. An embodiment of the present invention is a substantially circular robotic sweeper containing certain features. As shown in FIG. 4 and FIG. 5, for example, the mobile robot 310 of one embodiment includes housing infrastructure 320 that includes a chassis 421 supporting mechanical and electrical components. These components include various sensors 350, including two bump sensors 552 and 553 located in the forward portion of the robot, four cliff sensors 554 located on a robot shell 525 of the housing infrastructure 320, and a wall following sensor 556 mounted on the robot shell 525.

Note that it is of particular interest to characterize the path loss at a typical desktop height and a typical carrying height, e.g., about 3 ft off the ground. Thus, in one embodiment, the robot is about 3 ft tall robot, and, in another embodiment, the antenna of the transceiver on the robot is placed 3 ft off the ground. One such embodiment includes one or more bump and/or deflection sensors for the antenna element.

In other embodiments, as few as one sensor may be used in the robot. One of skill in the art will recognize that the sensor(s) 350 may be of a variety of types including sonar, tactile, electromagnetic, capacitive, etc. A low cost embodiment of the robot of the present invention uses bump (tactile) sensors 552 & 553 and reflective IR proximity sensors for the cliff sensors 554 and the wall-following sensor 556. Details of one embodiment of the IR proximity sensors is described in U.S. Pat. No. 6,594,844 titled ROBOT OBSTACLE DETECTION SYSTEM. The motive subsystem 340 of one embodiment of the robot also contains two wheels 541, and motors 542 for driving the wheels independently. The control module 360 includes a microcontroller 562 powered by a power subsystem 330 that includes a rechargeable battery or other power source known in the art. Examples include the mobile robot driving to a wall socket and charging itself. Alternately, or in addition, an alarm may be used to indicate that the robot has limited power. On example of such an alarm is an alarm sent over a WLAN to a WLAN controller indicating a low power situation and the last known position]. These components are well known in the art and are not discussed in detail herein. The robotic site-survey device 310 further includes a location system 370 and a transceiver 380, e.g., in the form of a wireless station of a WLAN. One embodiment of the robotic site-survey device 310 comprises an outer shell 525 defining a dominant side, non-dominant side, and a front portion of the robot 310. The dominant side of the robot is the side that is kept near or in contact with an object (or obstacle) when the robot moves in the area adjacent to that object (or obstacle). In one embodiment, the dominant side of the robot 310 is the right-hand side relative to the primary direction of travel, although in other embodiments the dominant side may be the left-hand side. In still other embodiments, the robot may be symmetric and thereby does not need a dominant side. In one embodiment, a dominant side is chosen for reasons of cost. The primary direction of travel is as shown in FIG. 5 by arrow 540. In one embodiment, two bump sensors 552 & 553 are located forward of the wheels 541 relative to the direction of forward movement, shown by arrow 540. One bump sensor 553 is located on the dominant side of the robot 310 and the other bump sensor 552 is located on the non-dominant side of the robot 310. When both of these bump sensors 552 and 553 are activated simultaneously, the robot 310 recognizes an obstacle in the front position. In other embodiments, more or fewer individual bump sensors can be used. Likewise, any number of bump sensors can be used to divide the device into any number of radial segments. While in one embodiment the bump sensors 552 & 553 are IR break beam sensors activated by contact between the robot 310 and an obstacle, other types of sensors can be used, including mechanical switches and capacitive sensors that detect the capacitance of objects touching the robot or between two metal plates in the bumper that are compressed on contact. Non-contact sensors, which allow the robot to sense proximity to objects without physically touching the object, such as capacitive sensors or a curtain of IR light, can also be used. It is useful to have a sensor or sensors that are not only able to tell if a surface has been contacted (or is nearby), but also the angle relative to the robot at which the contact was made. In the case of one embodiment, the robot is able to calculate the time between the activation of the right and left bump switches 552 & 553, if both are activated. The robot is then able to estimate the angle at which contact was made. In one embodiment, the bump sensor comprises a single mechanical bumper at the front of the robot with sensors substantially at the two ends of the bumper that sense the movement of the bumper. When the bumper is compressed, the timing between the sensor events is used to calculate the approximate angle at which the robot contacted the obstacle. When the bumper is compressed from the right side, the right bump sensor detects the bump first, followed by the left bump sensor, due to the compliance of the bumper and the bump detector geometry. This way, the bump angle can be approximated with only two bump sensors.

Also, in certain embodiments, the robot may include one or more user inputs. For example, as shown in FIG. 4 and FIG. 5, one embodiment includes three simple buttons 433 that allow the user to input the approximate size of the surface to be covered. In one embodiment, these buttons labeled "small," "medium," and "large" correspond respectively to rooms of 11.1, 20.8 and 27.9 square meters. While the robot described above is designed for inexpensive mass production, and for autonomous navigation in a room, modifications are known for providing navigation in both hallways between rooms, and in a room. See, for example, Blaasvaer, H.; Pirjanian, P.; Christensen, H.I.; "AMOR-an autonomous mobile robot navigation system," 1994IEEE International Conference on Systems, Man, and Cybernetics, 1994.'Humans, Information and Technology', Volume 3,2-5 Oct. 1994 Page(s): 2266-2271. In that paper an autonomous mobile robot navigation system, capable, e.g., of performing automated office delivery tasks, is described. The implemented prototype system is capable of autonomously navigating from one room to another designated by the operator. This involves: 1) navigation in a room, where the robot dynamically detects and avoid obstacles; 2) hall navigation, where it follows the walls by a reactive scheme; and 3) door traversing, where the robot autonomously positions the door and passes safely through it. The only a priori knowledge used by the system consists of a graph representation of the navigation environment, containing door positions. A priori, no knowledge is provided about the position, physical or geometrical properties of other objects in the environment. See also Jane Yung-Jen Hsu; Liang-Sheng Hwang: "A graph-based exploration strategy of indoor environments by an autonomous mobile robot," 1998 IEEE International Conference on Robotics and Automation, 1998. Volume 2, 16-20 May 1998 Page(s): 1262-1268. The Hsu paper presents a provably complete strategy for indoor environment exploration by an autonomous mobile robot. Without prior knowledge about the environment, the strategy guarantees the construction of a grid-based map, of the entire reachable area within a bounded region. Multiple map representations are utilized including a topological grid map for guiding the exploration process, a modified occupancy grid for fusing data from multiple range sensors, and a hierarchy of grids for real-time navigation. Experiments using a Nomad 200 (TM) robot made by Nomadic Technologies, Inc., Mountain View, Calif. have shown accurate map construction while navigating at a steady speed of 0.2 m/sec. Note that Nomadics Technology, Inc. was taken over by 3Com, and stopped selling its robots. However, support for these robots is available elsewhere. See drobot~dot~sourceforge~dot~net/faq.html (27 Jul. 2005) where"~dot~"represents a period in the actual URL.

Thus, a mobile robot provides locomotion to the sensing devices and further permits a level of autonomy. An example of such an autonomous robot used in a security role, but that may be adapted to include the position determining system and radio transceiver is described in Kajiwara et al.: "Development of a Mobile Robot for Security Guard," Proceedings of the 525th International Symposium on Industrial Robots, vol. 1, pp. 271-278, 1985. The system described by Kajiwara is a relatively large, independent robot developed to execute a predetermined task, which in this case, is to conduct the "rounds" of a human security guard.

Other systems that can be adapted to include the transceiver and position determining subsystem and that are commercially available include the HelpMate System and the Cybermotion's Roving Robots from Cybermotion, Inc. (Roanoke, Va.). See Kochan, "HelpMate to Ease Hospital Delivery and Collection Tasks, Assist with Security," Industrial Robot, vol. 24, no. 3, pp. 226-228, 1997; and Orwig, "Cybermotion's Roving Robots," Industrial Robot, vol. 541, no. 3, pp. 27-29, 1993.

In addition to the methods described above, other techniques for obstacle avoidance include the use of proximity sensors. For example, the TRILOBITE™, a mobile robot embodied as an automated vacuum cleaner available from Electrolux AB of Sweden, uses sonar sensors to detect obstacles in the vicinity of the robot. As another example, the RoboScout Personal Robot, available from Sharper Image Corporation (San Francisco, Calif.), uses infrared sensors for a similar purpose. See U.S. Pat. No. 6,604,022 to Parker, et al., titled ROBOT FOR AUTONOMOUS OPERATION (Aug. 5, 2003). Note that the Sharper image robot includes legs and arms that would not be used in an implementation of the present invention. Even more sophisticated obstacle detection systems can be found in industrial applications. For example, the Pioneer series of robots from ActivMedia Robotics, LLC (Amherst, N.H.), uses a laser range finder to detect nearby obstacles. Disadvantageously however, proximity sensors often do not reliably detect obstacles and can be relatively expensive. For examples, proximity sensors can suffer from blind spots and can often fail to reliably detect obstructions. For example, a laser range finder typically performs proximity detection in a single plane such that an obstacle of non-uniform shape, such as an obstacle with a bump or an overhang, may not be reliably detected as an obstacle by the laser range finder.

Other mechanisms can also permit a mobile robot to move about safely and autonomously.

The exemplary modification of the Roomba/iRobot robot is one embodiment for practicing the present invention, and one of skill in the art is able to choose from elements known in the art to design a robot for the particular purpose of automatically moving in an area to obtain a site survey, e.g., using the example systems described above. Examples of other suitable robot designs include those described in the following U.S. patents: U.S. Pat. No. 4,306,329 (Yokoi), U.S. Pat. No. 5,109,566 (Kobayashi et al.), U.S. Pat. No. 5,293,955 (Lee), U.S. Pat. No. 5,369,347 (Yoo), U.S. Pat. No. 5,440,216 (Kim), U.S. Pat. No. 5,534,762 (Kim), U.S. Pat. No. 5,613,261 (Kawakami et al.), U.S. Pat. No. 5,634,237 (Paranjpe), U.S. Pat. No. 5,781,960 (Kilstrom et al.), U.S. Pat. No. 5,787,545 (Colens), U.S. Pat. No. 5,815,880 (Nakanishi), U.S. Pat. No. 5,839,156 (Park et al.), U.S. Pat. No. 5,926,909 (McGee), U.S. Pat. No. 6,038,501 (Kawakami), and U.S. Pat. No. 6,076,226 (Reed), all of which are hereby incorporated by reference. Of course, lots of other robot designs also are possible.

Even more designs may be used. The following US patents and Patent Application Publications describe aspects of alternate methods of implementing autonomous robots and other robotic aspects that might be used in alternate embodiments of the invention. How to modify the descriptions in any of these publications to accommodate aspects of the present invention would be clear to those in the art.

US Patent Application Publication No. 20050113990 titled "AREA COVERAGE WITH AN AUTONOMOUS ROBOT."

US Patent Application Publication No. 20050065652 titled "AUTONOMOUSLY MOVING ROBOT MANAGEMENT SYSTEM."

US Patent Application Publication No. 20050038562 titled "SEMI-AUTONOMOUS OPERATION OF A ROBOTIC DEVICE."

US Patent Application Publication No. 20040207355 titled "METHOD AND SYSTEM FOR MULTI-MODE COVERAGE FOR AN AUTONOMOUS ROBOT."

US Patent Application Publication No. 20040187249 titled "AUTONOMOUS FLOOR-CLEANING ROBOT."

US Patent Application Publication No. 20040173116 titled "AUTONOMOUS ROBOTIC CRAWLER FOR IN-PIPE INSPECTION."

US Patent Application Publication No. 20040049877 titled "AUTONOMOUS FLOOR-CLEANING ROBOT."

US Patent Application Publication No. 20030212472 titled "AUTONOMOUS MULTI-PLATFORM ROBOT SYSTEM."

US Patent Application Publication No. 20030208304 titled "AREA COVERAGE WITH AN AUTONOMOUS ROBOT."

US Patent Application Publication No. 20030089267 titled "AUTONOMOUS ROBOTIC CRAWLER FOR IN-PIPE INSPECTION."

US Patent Application Publication No. 20030055532 titled "AUTONOMOUS ACTION ROBOT."

US Patent Application Publication No. 20030009261 titled "ROBOT CAPABLE OF AUTONOMOUS OPERATION."

US Patent Application Publication No. 20020183895 titled "TRAINING OF AUTONOMOUS ROBOTS."

US Patent Application Publication No. 20020095239 titled "AUTONOMOUS MULTI-PLATFORM ROBOT SYSTEM."

US Patent Application Publication No. 20020011367 titled "AUTONOMOUSLY NAVIGATING ROBOT SYSTEM."

US Patent Application Publication No. 20050132527 titled "APPARATUS FOR FLOOR CLEANING AND TREATMENT."

US Patent Application Publication No. 20050010331 titled "ROBOT VACUUM WITH FLOOR TYPE MODES."

US Patent Application Publication No. 20050000543 titled "ROBOT VACUUM WITH INTERNAL MAPPING SYSTEM."

US Patent Application Publication No. 20040244138 titled "ROBOT VACUUM."

US Patent Application Publication No. 20040236468 titled "ROBOT VACUUM WITH REMOTE CONTROL MODE."

US Patent Application Publication No. 20040211444 titled "ROBOT VACUUM WITH PARTICULATE DETECTOR."

US Patent Application Publication No. 20040204792 titled "ROBOTIC VACUUM WITH LOCALIZED CLEANING ALGORITHM."

US Patent Application Publication No. 20040200505 titled "ROBOT VAC WITH RETRACTABLE POWER CORD."

US Patent Application Publication No. 20040134337 titled "SYSTEM, METHODS AND APPARATUS FOR MOBILE SOFTWARE AGENTS APPLIED TO MOBILE ROBOTIC VEHICLES."

US Patent Application Publication No. 20040134336 titled "SYSTEM, METHODS AND APPARATUS FOR AGGREGATING GROUPS OF MOBILE ROBOTIC VEHICLES."

US Patent Application Publication No. 20040111184 titled "NAVIGATIONAL CONTROL SYSTEM FOR A ROBOTIC DEVICE."

US Patent Application Publication No. 20040076324 titled "SYSTEMS AND METHODS FOR THE AUTOMATED SENSING OF MOTION IN A MOBILE ROBOT USING VISUAL DATA."

US Patent Application Publication No. 20040068416 titled "SYSTEM, METHOD AND APPARATUS FOR IMPLEMENTING A MOBILE SENSOR NETWORK."

US Patent Application Publication No. 20040068415 titled "SYSTEM, METHODS AND APPARATUS FOR COORDINATION OF AND TARGETING FOR MOBILE ROBOTIC VEHICLES."

US Patent Application Publication No. 20040068351 titled "SYSTEM, METHODS AND APPARATUS FOR INTEGRATING BEHAVIOR-BASED APPROACH INTO HYBRID CONTROL MODEL FOR USE WITH MOBILE ROBOTIC VEHICLES."

US Patent Application Publication No. 20040030571 titled "SYSTEM, METHOD AND APPARATUS FOR AUTO-

MATED COLLECTIVE MOBILE ROBOTIC VEHICLES USED IN REMOTE SENSING SURVEILLANCE."

US Patent Application Publication No. 20040030570 titled "SYSTEM, METHODS AND APPARATUS FOR LEADER-FOLLOWER MODEL OF MOBILE ROBOTIC SYSTEM AGGREGATION."

US Patent Application Publication No. 20040030451 titled "METHODS AND APPARATUS FOR DECISION MAKING OF SYSTEM OF MOBILE ROBOTIC VEHICLES."

US Patent Application Publication No. 20040030450 titled "SYSTEM, METHODS AND APPARATUS FOR IMPLEMENTING MOBILE ROBOTIC COMMUNICATION INTERFACE."

US Patent Application Publication No. 20040030448 titled "SYSTEM, METHODS AND APPARATUS FOR MANAGING EXTERNAL COMPUTATION AND SENSOR RESOURCES APPLIED TO MOBILE ROBOTIC NETWORK."

US Patent Application Publication No. 20030216834 titled "METHOD AND SYSTEM FOR REMOTE CONTROL OF MOBILE ROBOT."

US Patent Application Publication No. 20030137268 titled "MINIATURE ROBOTIC VEHICLES AND METHODS OF CONTROLLING SAME."

US Patent Application Publication No. 20030025472 titled "METHOD AND SYSTEM FOR MULTI-MODE COVERAGE FOR AN AUTONOMOUS ROBOT."

US Patent Application Publication No. 20020189871 titled "ROBOTIC PLATFORM."

US Patent Application Publication No. 20020173877 titled "MOBILE ROBOTIC WITH WEB SERVER AND DIGITAL RADIO LINKS."

US Patent Application Publication No. 20020021219 titled "ANIMAL COLLAR INCLUDING TRACKING AND LOCATION DEVICE."

US Patent Application Publication No. 20010047895 titled "WHEELED PLATFORMS."

US Patent Application Publication No. 20010037163 titled "METHOD AND SYSTEM FOR REMOTE CONTROL OF MOBILE ROBOT."

U.S. Pat. No. 6,885,912 titled "AREA COVERAGE WITH AN AUTONOMOUS ROBOT."

U.S. Pat. No. 6,883,201 titled "AUTONOMOUS FLOOR-CLEANING ROBOT."

U.S. Pat. No. 6,853,880 titled "AUTONOMOUS ACTION ROBOT."

U.S. Pat. No. 6,836,701 titled "AUTONOMOUS MULTI-PLATFORM ROBOTIC SYSTEM."

U.S. Pat. No. 6,809,520 titled "COMPACT TITLED "AUTONOMOUS ROBOTIC DETECTION AND IDENTIFICATION SENSOR SYSTEM OF UNEXPLODED ORDNANCE SITE REMEDIATION."

U.S. Pat. No. 6,809,490 titled "METHOD AND SYSTEM FOR MULTI-MODE COVERAGE FOR AN AUTONOMOUS ROBOT."

U.S. Pat. No. 6,760,647 titled "SOCIALLY INTERACTIVE AUTONOMOUS ROBOT."

U.S. Pat. No. 6,760,645 titled "TRAINING OF AUTONOMOUS ROBOTS."

U.S. Pat. No. 6,615,108 titled "AREA COVERAGE WITH AN AUTONOMOUS ROBOT."

U.S. Pat. No. 6,604,022 titled "ROBOT FOR AUTONOMOUS OPERATION."

U.S. Pat. No. 6,539,284 titled "SOCIALLY INTERACTIVE AUTONOMOUS ROBOT."

U.S. Pat. No. 6,496,755 titled "AUTONOMOUS MULTI-PLATFORM ROBOT SYSTEM."

U.S. Pat. No. 6,414,457 titled "AUTONOMOUS ROLLING ROBOT."

U.S. Pat. No. 6,374,155 titled "AUTONOMOUS MULTI-PLATFORM ROBOT SYSTEM."

U.S. Pat. No. 6,162,171 titled "ROBOTIC ENDOSCOPE AND AN AUTONOMOUS PIPE ROBOT FOR PERFORMING ENDOSCOPIC PROCEDURES."

U.S. Pat. No. 6,134,486 titled "ROBOT AND METHOD OF CONTROL FOR AN AUTONOMOUS VEHICLE TO TRACK A PATH CONSISTING OF DIRECTED STRAIGHT LINES AND CIRCLES WITH POSITIONAL FEEDBACK AND CONTINUOUS CURVATURE."

U.S. Pat. No. 6,112,996 titled "IC CARD AND AUTONOMOUS RUNNING AND WORKING ROBOT HAVING AN IC CARD MOUNTING APPARATUS."

U.S. Pat. No. 6,108,597 titled "AUTONOMOUS MOBILE ROBOT SYSTEM FOR SENSOR-BASED AND MAP-BASED NAVIGATION IN PIPE NETWORKS."

U.S. Pat. No. 5,936,240 titled "MOBILE AUTONOMOUS ROBOTIC APPARATUS FOR RADIOLOGIC CHARACTERIZATION."

U.S. Pat. No. 5,911,767 titled "NAVIGATION SYSTEM FOR AN AUTONOMOUS MOBILE ROBOT."

U.S. Pat. No. 5,774,632 titled "METHOD AND DEVICE FOR THE CONTROL OF AN AUTONOMOUSLY EXPLORING ROBOT."

U.S. Pat. No. 5,770,913 titled "ACTUATORS TITLED "MOTORS AND WHEELLESS AUTONOMOUS ROBOTS USING VIBRATORY TRANSDUCER DRIVERS."

U.S. Pat. No. 5,758,298 titled "AUTONOMOUS NAVIGATION SYSTEM FOR A MOBILE ROBOT OR MANIPULATOR."

U.S. Pat. No. 5,324,948 titled "AUTONOMOUS MOBILE ROBOT FOR RADIOLOGIC SURVEYS."

U.S. Pat. No. 5,144,685 titled "LANDMARK RECOGNITION FOR AUTONOMOUS MOBILE ROBOTS."

U.S. Pat. No. 5,124,918 titled "NEURAL-BASED AUTONOMOUS ROBOTIC SYSTEM."

U.S. Pat. No. 4,638,445 titled "AUTONOMOUS MOBILE ROBOT."

The Transceiver

In one embodiment, the transceiver 380 is a wireless station of a WLAN, e.g., in the form of a WLAN card that includes a radio transceiver with the necessary MAC drivers to be able to transmit and receive frames that conform to the IEEE 802.11 standard.

In particular, in one embodiment, the wireless station is a managed station that is controlled by a central management entity called the WLAN manager herein, the managed station so managed via a managed access point. The managed wireless network substantially conforms to the IEEE 802.11 standard in that the network is compatible with that standard, and includes slight modifications, such as additional MAC frames that are used to convey information such as transmit power and signal strength measurements. Furthermore, managed stations of the network measure the received signal strength relatively accurately. By a managed access point is meant an access point at a known location whose transmit power is known and whose received signal strength (called received signal strength indication, or RSSI herein) is measurable.

Figure 7:
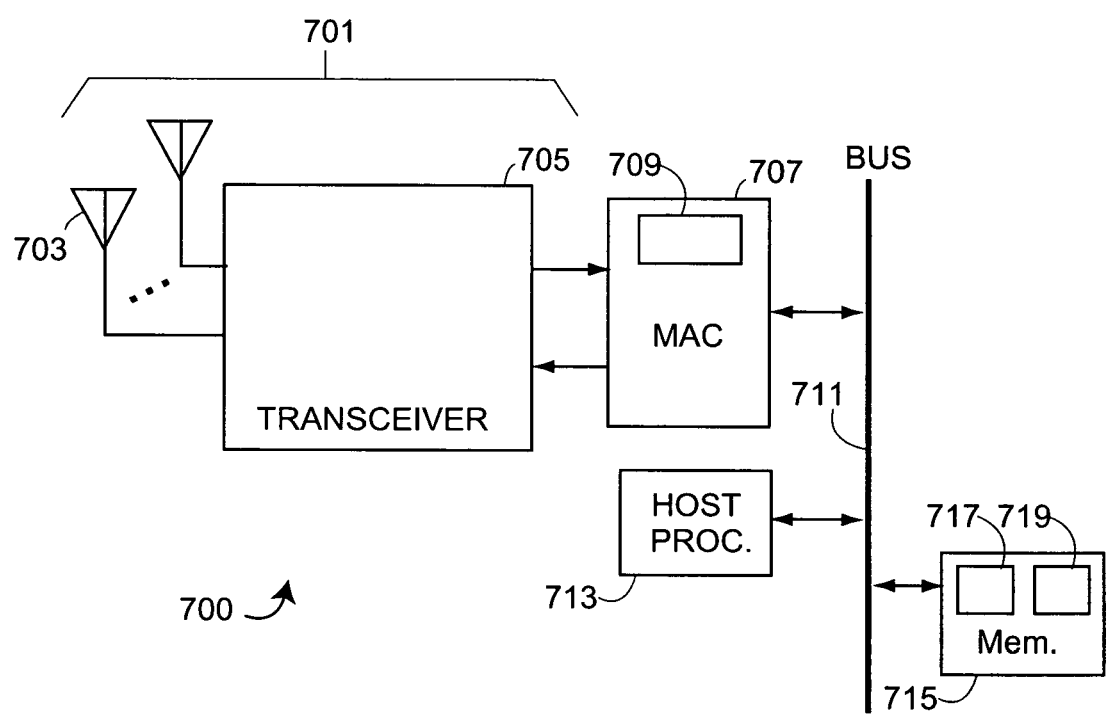
FIG. 7 shows one embodiment of a wireless station that is included in the mobile robot as the transceiver to implement one or more aspects of the present invention.

FIG. 7 shows one embodiment of a wireless station 700 that is included in the robot 310 as the transceiver 380 to implement one or more aspects of the present invention. While a wireless station such as station 700 is generally prior art, a wireless station that includes aspects of the present invention, e.g., in the form of software for carrying out the measurements for the site survey, is not necessarily prior art. The radio part 701 includes one or more antennas 703 that are coupled to a radio transceiver 705 including an analog RF part and a digital modem. The radio part thus implements the physical layer (the PHY). The digital modem of PHY 701 is coupled to a MAC processor 707 that implements the MAC processing of the station. The MAC processor 707 is connected via one or more busses, shown symbolically as a single bus subsystem 711, to a host processor 713. The host processor includes a memory subsystem, e.g., RAM and/or ROM connected to the host bus, shown here as part of bus subsystem 711.

In one embodiment, the MAC processing, e.g., the IEEE 802.11 MAC protocol is implemented totally at the MAC processor 707. The Processor 707 includes a memory 709 that stores the instructions for the MAC processor 707 to implement the MAC processing, and in one embodiment, some or all of the additional processing used by the present invention.

The MAC processor is controlled by the host processor 713. In one embodiment, some of the MAC processing is implemented at the MAC processor 707, and some is implemented at the host. In such a case, the instructions (the code) for the host 713 to implement the host-implemented MAC processing are stored in the memory 715. In one embodiment, some or all of the additional processing used by the present invention is also implemented by the host. These instructions are shown as part 717 of memory.

Radio Measurement and the Managed Network

An aspect of the invention includes using management frames at the MAC layer designed, sent, and received for radio measurement purposes to carry out a site survey. Aspects of the invention use data from and/or about beacons and probe responses received at APs and/or at the wireless station 380 of the mobile robot 310. In one embodiment, the obtaining and receiving of such data is managed by a management entity.

In this description, we assume a single management entity we call the WLAN Manager. Management entities we call Subnet Context Managers may be included, each controlling some aspects of a single subnet or virtual local area network (VLAN). A Subnet Context Manager, for example, may relay instructions from the WLAN manager to all managed APs in its subset or VLAN. In some embodiments, the functions of the subnet context manager are carried out at a higher level, e.g., at the same level as the WLAN Manager. Other embodiments may have a different number of levels in the hierarchy with different levels of management. For example, in some embodiments, the functions of the subnet context manager are carried out at a higher level, e.g., at the same level as the WLAN Manager. For more information on radio management, see U.S. patent application Ser. No. 80/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

The WLAN Manager manages several aspects of the wireless network, e.g., security, and in one embodiment, authorizes a set of access points in the network—we call these the managed access points—including maintaining a database called the Configuration Database that contains configuration parameters. The Configuration Database also includes an AP database that includes information on the managed APs, e.g., a list of the managed APs together with some data related to these APs, such as the location of the APs and the power the APs are set to transmit at. The WLAN Manager provides centralized control of various aspects of the radio environment within a given set of APs, including the measurement aspects of the present invention and, in one embodiment, in which the location determining system to determine the location of the robot uses radiolocation, the radiolocation aspects of the present invention. Once a site survey is obtained, the WLAN Manager provides the ability to determine network wide radio parameters during initial network deployment and network expansion. In one embodiment, the WLAN Manager selects certain radio parameter values to provide an adequate radio environment. In one embodiment, the WLAN Manager further centrally coordinates all client and AP measurements.

Thus, aspects of the invention are implemented on the WLAN Manager and use measurements made under control of the WLAN manager to carry out the site survey. However, the invention does not require there to be a single WLAN Manager entity. The functionality described herein may be incorporated into any of other management entities, e.g., at a local level, or by a separate manager called the Radio Manager that controls the radio aspects of the WLAN. Furthermore, any of these management entities may be combined with other functionalities, e.g., switching, routing, and so forth.

Figure 8:
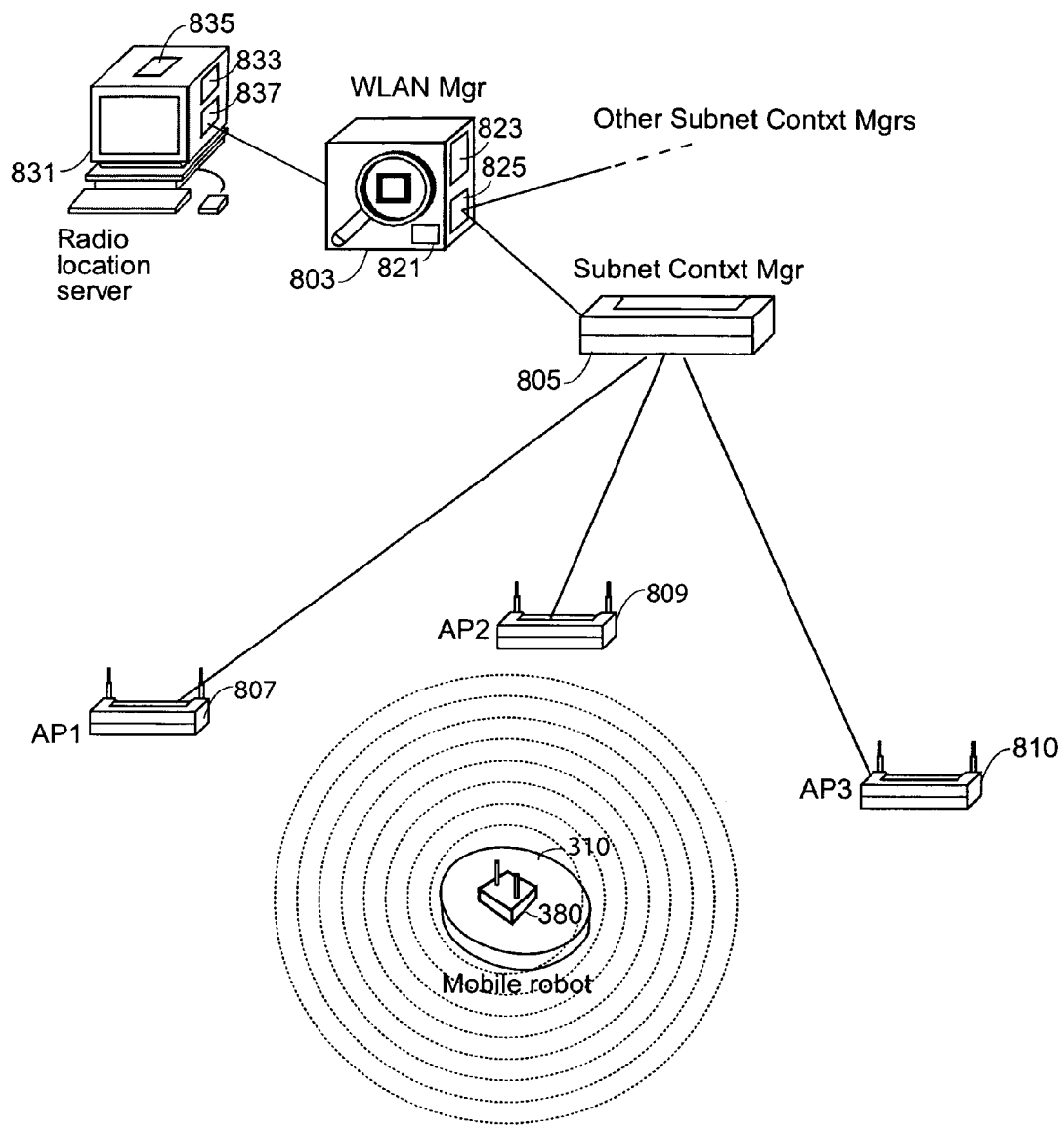
FIG. 8 shows a simple managed network in which an embodiment of the present invention operates, and wherein all wireless management entities are assumed incorporated into a single management entity—the WLAN Manager.

A simple managed network is shown in FIG. 8. All managers are assumed incorporated into a single management entity—the WLAN Manager—that has access to the AP Database. It is to be understood that the WLAN Manager incorporates the functions of the Radio Manager.

FIG. 8 shows a WLAN manager 803 that includes a processing system 823 with one or more processors and a memory 821. The memory 821 includes instructions that cause one or more processors of the processing system 823 to implement WLAN Management aspects that are implemented in the WLAN Manager. The WLAN manager 803 includes a network interface 825 for coupling to a network, typically wired. In one embodiment, the WLAN manager is part of a network switch and operated under a network operating system, in this case IOS (Cisco Systems, Inc., San Jose, Calif.).

The WLAN Manager 803 is coupled via its network interface 825 and a network (typically a wired network) to a set of Subnet Context Managers. One such Subnet Context Manager is shown as element 805 in FIG. 8. All managed APs in a subnet register with a Subnet Context Manager. For example, in FIG. 8, three APs named AP1, AP2, and AP3 (807, 809, and 810, respectively) each are part of the same subnet and have a network connection to Subnet Context Manager 805. Any management communication between the WLAN Manager 803 and APs 807, 809 and 810 is then via the Subnet Context Manager 805.

A location server 831 is coupled to the network. The location server 831 includes a processing system 833 with one or more processors and a memory 835. The memory 835 includes instructions that cause one or more processors of the processing system 833 to implement location determining of the present invention that are implemented in the location server 831. The location server 831 includes a network interface 837 for coupling to a network, typically wired. In the implementation shown here, the location server 831 is coupled to the WLAN manager 803 and managed therefrom. In alternate implementations, the location server 831 is completely independent of the WLAN manager 803. For example, there may be no WLAN manager present. In yet another embodiment, the location server is implemented in the same hardware as the WLAN manager 803, such that the network interface 837 is or is part of network interface 825, the memory 835 is or is in memory 821, and the processing system 833 is part or all of the one or more processors of processing system 823. In yet another implementation, the location server 831 is part of the subnet context manager 805.

Also shown is the mobile robot 310 with a wireless station 380.

One aspect of the invention is that the wireless station 380 of the wireless robot transmits 802.11 frames at a plurality of locations. The transmitting is at known transmit power. APs, e.g., APs 807, 809, and 810 listen to the frames and measure the received signal strength, e.g., as the RSSI. In one embodiment, the wireless station 380 transmits 802.11 beacons. By passive scanning, is meant listening for beacons and probe responses without first transmitting a probe request. Thus, for an AP, passive scanning is the listening for and recording of information from beacons and probe responses from other APs that are transmitting such beacons and probe response, or, in the case of one embodiment of the present invention, from the wireless station 380 of the mobile robot 310 that is transmitting. In an alternate embodiment, the wireless station 380 of the mobile robot 310 listens for beacons and probe responses from APs, stores information from such received beacons and probe responses, and then reports information, such as the RSSI and other information from beacons and probe responses. In such an embodiment, passive scanning is the listening for and recording of information from such beacons and probe responses from APs that are transmitting such beacons and probe responses at known transmit powers.

By active scanning, is meant transmitting a probe request to elicit one or more probe responses. Beacons may be listened to before or after the probe request is transmitted, depending on the implementation of the scan. Both active and passive scanning can occur on the same channel used for wireless communication (the "serving" channel) or other channels ("non-serving" channels). For non-serving channels typically an active scan is used. One method call incremental active scanning herein is the case wherein a station probes another channel. Another called full active scanning herein is the case wherein the serving channel is vacated to probe all channels. Most wireless network interface devices support a mode usually called monitor mode wherein traffic on all channels is recorded, and this can be used for full active scanning.

According to one aspect of the invention, each station such as the APs 807, 809, and 810, and also the station 380 of the mobile robot maintains a database of the beacons and probe responses it receives. In the context of aspects of the present invention, beacons and probe responses received at the station are stored in the database as a result of an active scan or a passive scan. We call this database the Beacon Table. The Beacon Table is stored in the memory of the station. A station stores the information in the beacons and probe responses in its Beacon Table, and further stores additional information about the state of the station when it receives the beacon.

Because the station stores beacons and probe responses it has received in its Beacon Table, one form of passive scanning includes simply reporting the accumulated contents of the station's Beacon Table. Note that an alternate embodiment may alternately include the station's listening for a specified period of time and reporting the incremental Beacon Table information for the specified period of time.

According to yet another aspect, a station when implementing an AP such as APs 807, 809, and 810 is capable of active scanning, in particular incremental active scanning. To carry out an incremental active scan, the AP vacates its serving channel and probes one or more channels by sending a probe request frame on that/those channel(s). The AP prevents client transmissions by scheduling a contention free period (CFP). Alternatively the AP can prevent client transmissions by transmitting an unsolicited CTS with a duration long enough to cover the active scan time. According to yet another embodiment in which the station 380 of the mobile robot listens to transmission from one or more APs to carry out the site survey, the station 380 is capable of active scanning, in particular incremental active scanning. To carry out an incremental active scan, the station 380 probes one or more channels by sending a probe request frame on that/those channel(s). The active scan includes reporting back the results of probing the other channel(s) in an active channel to an AP, called the serving AP of the station 380. In order to prevent transmissions from the serving AP, the station 380 of the robot 310 must indicate that it is in a power save mode. Alternatively the station 380 can use specific local knowledge such as application operation to assure that its AP will not send any transmissions directed at the station 380.

Scanning includes storing the information from beacons and probe responses received at the station, e.g., by passive or active scanning in the Beacon Table.

Radio Management Tasks and Communication Protocols

Aspects of the invention use radio measurement in managed APs of beacons transmitted by the mobile robot's station 380. In another embodiment, aspects of the invention use radio measurement in the station 380 of the robot, in particular as a result of passive and/or active scanning for beacons and probe responses. One embodiment uses a modified MAC protocol that adds transmission power control (TPC) and dynamic frequency selection (DFS). This may be a modification of the IEEE 802.11h standard. TPC limits the transmitted power to the minimum needed to reach the furthest user. DFS selects the radio channel at an AP to minimize interference with other systems, e.g., radar. Thus the IEEE 802.11h proposal provides for power control, channel scan, and frequency selection. However, the inventors have found that 802.11's measurements decrease throughout. The IEEE 802.11h architecture (as of June 2003) uses a one-to-one request/response mechanism that may be inefficient. Another embodiment, described in more detail herein, uses a protocol that differs from the presently proposed 802.11 protocol by providing for tasking at the AP, or, in another embodiment, tasking at the station 380 via an AP. The tasking is to autonomously carry out passive and/or active scanning for beacons and probe responses according to a schedule at a plurality of locations of the mobile robot.

In one version of the site survey, one or more APs transmit to the mobile robot's station 380, in which case the mobile robot's station 380 is the receiving station, and the AP is the transmitting station. In another version of the site survey, the mobile robot's station 380 transmits, and is thus the transmitting station, and the transmissions are received in one or more APs, so that the AP(s) is/are the receiving station(s). The information reported by the receiving station(s) includes, for each detected probe response or beacon from the transmitting station, information about the detection, and information about or obtained from contents of the beacon/probe response. In one version, the detection information includes one or more of:

The detected transmitting station's BSSID, e.g., in the form of a MAC address.

The channel the transmitting station's probe response was received on.

The MAC address of the receiving station.

The RSSI detected at the PHY of the receiving station of the beacon/probe response.

Any other measures of received signal quality of the received beacon/probe response available at the PHY of the receiving station.

Other received beacons.

The beacon/probe response information sent includes one or more of:

SSID in the beacon or probe response from the transmitting station.

Beacon time (TSF timer) information. In one embodiment, this is sent in the form of TSF offset determined by comparing the timestamp in the beacon/probe response with the TSF timer at the managed station receiving the response.

Configuration parameters included in the received beacon/probe response.

In one embodiment, any location information about the location of the mobile robot 310 also is included.

Note that some of this information is beyond what is presently (June 2003) proposed for IEEE 802.11h. Further note that while the IEEE 802.11 standard specifies that a relative RSSI value be determined at the physical level (the PHY), one aspect of the invention uses the fact that many modern radios include a PHY that provides relatively accurate absolute RSSI measurements. Thus, the reports include the RSSI detected at the PHY of the receiver of the received beacon/probe response. In one embodiment, RSSIs detected at the PHYs are used to determine location information from path loss.

One embodiment uses a protocol we call the WLAN Manager-to-AP Measurement Protocol to set up the passive and/or active scanning and communicate reports thereof. According to this protocol, the WLAN Manager can send a message we call a Measurement Request Message to, and receives report messages we call Measurement Report Messages from one or more managed APs, either directly, or via one or more Subnet Context Managers. The messages are encapsulated in IP packets, e.g., in Ethernet frames or UDP/TCP/IP packets. In one embodiment, Ethernet is used between a Subnet Context Manager and an AP, while IP encapsulation is used for inter-subnet messages.

In the case that the Measurement Request Message is to a Subnet Context Manager, the Measurement Request Message includes a measurement request routing list where one or more APs may reside and the request message for such APs. A Subnet Context Manager receiving a Measurement Request Message forwards the request message to each AP in the routing list in the form of individual Measurement Request Messages for each destination AP. Each Measurement Request Message to an AP includes a specification of what actions are to be taken, how, and when, and applies to the AP and in one embodiment, to one or more of the AP's clients. According to the Measurement Request Message, the AP schedules its own measurements. In one embodiment, the WLAN Manager-to-AP Measurement Protocol provides for requesting a stream of measurements of specified duration and recurring as a specified periodic rate. The WLAN Manager may request measurements to be performed serially or in parallel.

The AP receiving the Measurement Request Message schedules the actual measurements. In one embodiment, the AP receiving a Measurement Request Message responds with a message we call a Measurement Request Acknowledgment Message, while in another embodiment, no acknowledgement is used.

In the case that the Measurement Request Message includes a schedule for the robot's wireless station 380, the AP translates the Measurement Request Message into a measurement request. In one embodiment, the measurement communication between the APs and the robot's wireless station 380 uses MAC frames that conform to a modification of the IEEE 802.11 standard MAC protocol we call the AP-to-client Measurement MAC Protocol herein.

An AP receiving a Measurement Request Message periodically sends a report message we call a Measurement Report Message herein that includes reports from each station performing a measurement. The report part for each station includes the type of station performing the measurement (AP, the robot's station, and so forth), the MAC of the measuring station, and the actual measurement data, including any location data for the location of the mobile robot 310 during the measurement. In this invention, we are concerned with reports of beacons and probe responses received at a station, and such a report in one embodiment includes the received signal strength (RSSI), e.g., in dBm, the channel, the measurement duration, the BSSID, TSF information in the beacon/probe response, and of the station receiving the beacon/probe response, the beacon interval, the capability contained in the beacon, and one or more other items of information. Of course, any location information also is included. Furthermore, in an alternate embodiment, noise measurements also are made.

The Measurement Report Messages are sent directly to the WLAN manager if no Subnet Context Managers are involved. In the case a context manager is in the path to the WLAN manager, the Subnet Context Manager receives the Measurement Report Messages from a set of APs in its subnet, and aggregates these to form an aggregated report that includes the individual reports. The aggregated report is sent as a Measurement Report Message to the WLAN manager. The site survey is generated from the reported information. In the case that the information includes the location of the robot, such information is used directly to produce the site survey. In the case that the information includes data related to and that is usable to determine the location, the information is used by the WLAN manager and its location manager to determine the location.

The AP-to-Client Measurement MAC Protocol

The AP-to-client Measurement MAC Protocol includes IEEE 802.11 standard frames that are modified to include additional information that may be used by one or more embodiments of the invention. Any standard type MAC frames that conform to the AP-to-client Measurement MAC Protocol include an indication of such conformity. For example, an association request frame includes an element that indicated whether or not the station supports radio management including the ability to carry out and report the client measurements described herein. A beacon frame and a probe frame that conform to the AP-to-client Measurement MAC Protocol may include the transmit power of the AP transmitting the frame.

In one embodiment, a frame we call the Measurement Request Frame from the AP requests an active or passive scan by the mobile robot's wireless station 380 at a scheduled scan time with a report at a scheduled reporting time. Another message from the mobile robot's wireless station 380 to the AP produces a report back to AP on schedule. The Measurement Request Frame includes an identifier to be used by a responding mobile robot's wireless station 380, scheduling information indicate when the action is to take place, and a set of one or more measurement report elements. The measurement report elements include indications as to what sort of report is requested, for example the report from an active scan, the report from a passive scan, or the station's accumulated Beacon Table without any scan.

In one embodiment, a frame we call the Measurement Report Frame from the mobile robot's wireless station 380 provides a report in response to a Measurement Request Frame. The Report frame includes the MAC address of the station providing the report, the identifier from the corresponding Measurement Request Frame, and one or more measurement elements. The measurement elements for the case of a beacon or probe response include one or more of the channel number, the duration over which the beacon/probe response was measured, the PHY type (2.4 GHz DSSS, 2.4 GHz ODFM, 5 GHz OFDM, and so forth), the RSSI of the beacon/probe response, the parent TSF, e.g., all or some of the lower order bits of the serving AP's TSF at the time the mobile robot's wireless station 380 received the beacon or probe response, the TSF in the beacon/probe response, any location information about the mobile robot 310, and one or more other elements that are in the received beacon/probe response frame.

The site survey is generated using straightforward software. Ekahau Oy of Helsinki, Finland (U.S. company is Ekahau Inc., of Saratoga, Calif.) markets Ekahau Site Survey™ software suite that provides for recording, visualizing, analyzing, and reporting the performance of Wireless LANs (802.11a/b/g). Ekahau also provides a "Planner" module that can be used to plan WLANs and optimize the plan with real site surveys measurements. One embodiment of the invention uses the Ekahau Site Survey software, suitably modified, to work with the position determining system and the autonomous mobility aspects of the mobile robot 310.

Figure 9:
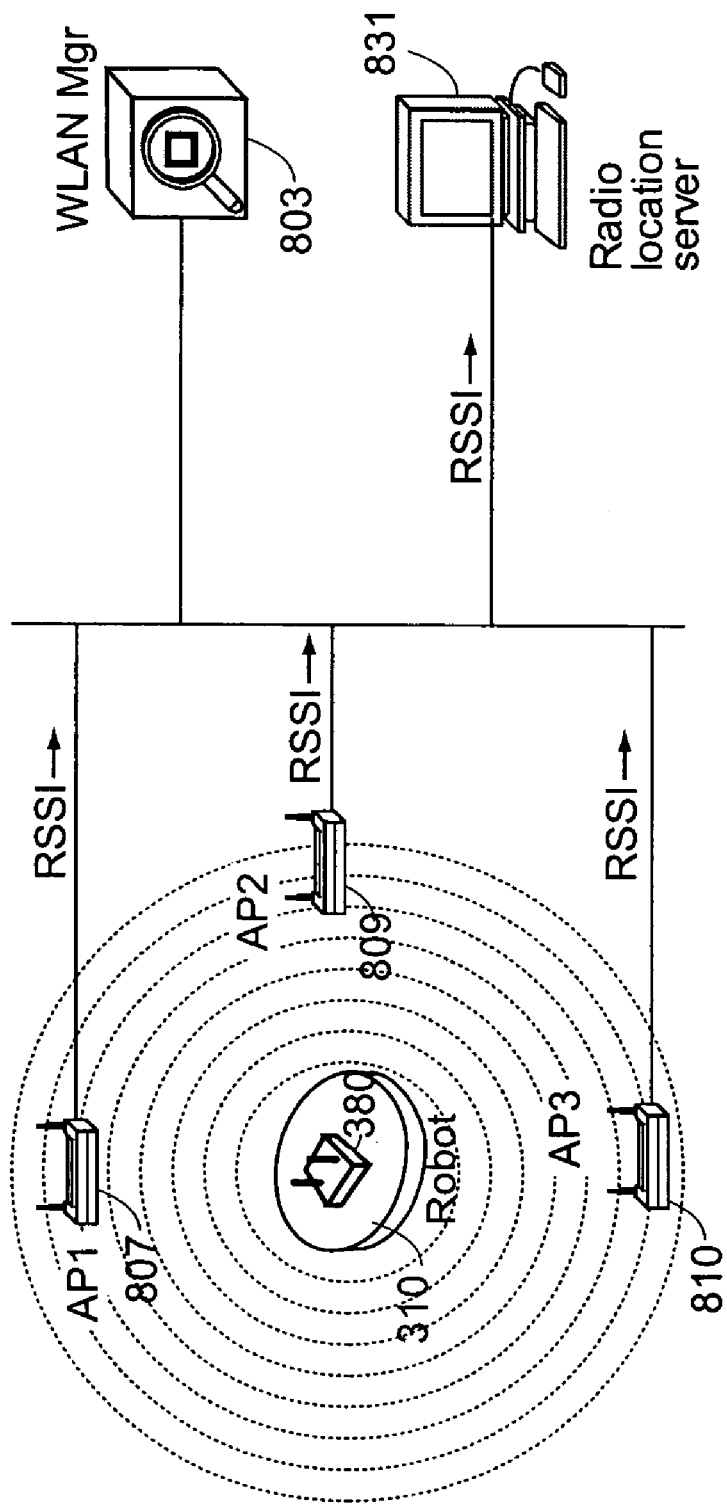
FIG. 9 shows a simplified arrangement of three access points in communication with a separate location server that is part of the location determining system for the mobile robot. The wireless station of the mobile robot is shown transmitting measurement frames to an assigned multicast address according to aspects of the invention.

FIG. 9 shows the exemplary network of FIG. 8 in a simplified form with three exemplary access points 807, 809, and 810 receiving transmissions from robot 310, and reporting at least the measured RSSI. The location server 831 is shown as a separate entity, and as explained herein, in some embodiments is included in the WLAN manager 803.

The Location Determining System

Different embodiments of the invention use different location determining systems to determine the location of the mobile robot 310.

One embodiment of the invention uses remote location determining methods to determine the location of the mobile robot. Different remote location methods are known that use, for example, ultrasound radiation, electromagnetic radiation such as infrared or radio, or a combination of ultrasound radiation and electromagnetic radiation, and such methods are readily modifiable to work with different embodiments of the present invention.

One such position determining method uses time of flight measurements of transmissions between the mobile robot and a plurality of known locations. In particular, the times of flight of ultrasound radiation emitted from a transmitter on the mobile robot and detected by a plurality of ultrasound sensors is measured. One such ultrasound system combines electromagnetic radiation, e.g., infrared that also is transmitted from a transmitter on the mobile robot. The electromagnetic radiation is assumed to be instantaneous compared to the time for the ultrasound to propagate, and thus provides a timing reference for determining the time of flight for the ultrasound radiation.

Radio Time Difference of Arrival Methods

Another such method uses time difference of arrival (TDOA) for radio signals between the mobile robot and a plurality of known locations. One such radio TDOA method is as described in co-assigned U.S. patent application Ser. No. 10/803,367 filed Mar. 18, 2004 to inventors Crawford, et al., titled RADIOLOCATION IN A WIRELESS NETWORK USING TIME DIFFERENCE OF ARRIVAL, the contents of which are incorporated herein by reference. One embodiment of the radiolocation method of the position determining system includes instructing the mobile robot's station 380 to transmit one or more packets at the different locations for radio measurement, and receiving at the location server (or the WLAN manager if it includes the location server) sets of timestamped captured samples, one set from each managed AP of the managed wireless network that receives a packet transmitted from the mobile robot's station 380. The timestamping uses a local timestamping clock to indicate when an AP receives a packet. The times of arrival of each packet at each AP are determined from the received sets of timestamped captured samples, and, the position of the mobile robot's station is determined from the determined times of arrival and the known location of the managed APs. Several transmissions between APs may be used to mutually calibrate local clocks of the APs.

One embodiment of the method further includes receiving transmit timestamps from the wireless station of the mobile robot that transmits to the APs. The robot's station 380 transmits at least once, and timestamps the transmit using an included local timestamping clock to indicate when the station 380 transmits a packet. The received transmit timestamps from the station 380 is also used to determine the position of the station 380 relative to the known positions of the receiving APs.

Another embodiment does not include sending transmit timestamps. Knowledge of the relative separation of the APs and of how to relate the managed APs' local clocks allows the necessity for a transmit time stamp from the robot's station 380 to be removed.

In one embodiment, determining the times of arrival of each packet includes, for each set of captured samples, correlating the captured samples with a reference signal to obtain a correlated result. The reference signal corresponds to at least part of the signal that was transmitted. One aspect of the TDOA location determining embodiment is deconvolving the correlated result, and determining the location of the first peak of the results of the deconvolving as an indication of the time of arrival.

Another aspect is an apparatus for inclusion in each managed AP. The apparatus includes a buffer subsystem and a timestamping subsystem, such that the station can capture and timestamp a set of samples of a received signal, and send the timestamped samples to a processing entity, e.g., the WLAN manager or, if a separate entity, the location server.

Other Radio Location Methods

Methods that use radio for determining the location are called radiolocation methods. The radio TDOA method described above is thus a radiolocation method.

Another embodiment of the robot of FIG. 3 includes a location determining system using radiolocation as described in U.S. patent application Ser. No. 10/629,384 filed Jul. 28, 2003 to inventors Kaiser et al., titled RADIOLOCATION USING PATH LOSS DATA, as well as a related method described in U.S. Provisional Patent Application Ser. No. 60/649,721 filed Feb. 3, 2005 to inventors Douglas et al., titled TAG LOCATION, CLIENT LOCATION, AND COVERAGE HOLE LOCATION IN A WIRELESS NETWORK. The contents of both U.S. patent application Ser. No. 10/629, 384 and U.S. Provisional Patent Application Ser. No. 60/649, 721 are incorporated herein by reference.

One embodiment of the Kaiser et al. invention and of the Kaiser et al. location determining method that is included in a location determining subsystem in the robot operates in a managed wireless network in which the APs and their clients are managed by a central management entity, called the WLAN manager herein. The WLAN card included with the robot also is managed by the central management entity. The APs further are assumed to be at known locations. The managed wireless network substantially conforms to the IEEE 802.11 standard in that the network is compatible with that standard, and includes slight modifications, such as additional MAC frames that are used to convey information such as transmit power and signal strength measurements. Furthermore, managed stations of the network measure the received signal strength relatively accurately. By a managed access point is meant an access points at a known location whose transmit power is known and whose received signal strength (called received signal strength indication, or RSSI herein) is measurable.

An implementation of the Kaiser et al. method includes accepting an ideal path loss model and calibrating the ideal path loss model using path loss measurements between a first set and a second set of managed access points of a managed wireless network in an area of interest. The stations of the first and second sets are at known locations. In one embodiment, the first and second sets are the same set of managed access points of the managed wireless network located in the area of interest. The path loss measurements are obtained using measurements received from the first set that measure the received signal strengths at each of the respective APs of the first set as a result of transmissions by each wireless station of the second set. Each transmission by a respective station of the second set is at a known respective transmit power. The method further includes measuring the path loss between the wireless station at the robot having an unknown location and at least some of the managed access points. The calibrating determines a calibrated path loss model between the access points. Such a calibrated model is then used to locate the wireless station located at the robot, and thus the robot's location. The wireless station located at the robot is a managed client of one of the managed access points transmitting at a transmit power whose value can be determined at the receiving AP.

The managed wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

Ekahau Oy of Helsinki, Finland (U.S. company is Ekahau Inc., of Saratoga, Calif.) markets software product called the Ekahau Positioning Engine that Ekahau asserts is "truly open" and can leverage any existing Wi-Fi network. Ekahau's positioning technology is based on signal strength calibration and fingerprinting. Therefore, one alternate embodiment uses Ekahau's positioning technology for the location determining system on the mobile robot 310, working together with the APs in the area of interest. The following patent publications relate to the Ekahau Oy system:

U.S. Patent Application Publication No. US20050136944 titled: SEQUENCE-BASED POSITIONING TECHNIQUE.

U.S. Patent Application Publication No. US20050131635 titled: ERROR ESTIMATE CONCERNING A TARGET DEVICE'S LOCATION OPERABLE TO MOVE IN A WIRELESS ENVIRONMENT.

U.S. Patent Application Publication No. US20050128139 titled: PROBABILISTIC MODEL FOR A POSITIONING TECHNIQUE.

U.S. Patent Application Publication No. US20040198373 titled: SYSTEM AND METHOD TO ANONYMOUSLY TEST FOR PROXIMITY OF MOBILE USERS WITHOUT REVEALING INDIVIDUAL PHASE SPACE COORDINATES.

U.S. Patent Application Publication No. US20040176108 titled: LOCATION APPLICATIONS FOR WIRELESS NETWORKS.

U.S. Patent Application Publication No. US20040111397 titled: METHOD AND APPARATUS FOR FUSING CONTEXT DATA.

U.S. Patent Application Publication No. US20040072577 titled: LOCATION ESTIMATION IN WIRELESS TELECOMMUNICATION NETWORKS.

U.S. Patent Application Publication No. US20030135486 titled: SYSTEM FOR ESTIMATING THE TEMPORAL VALIDITY OF LOCATION REPORTS THROUGH PATTERN ANALYSIS.

U.S. Patent Application Publication No. US20030130987 titled: RELEVANCE ASSESSMENT FOR LOCATION INFORMATION RECEIVED FROM MULTIPLE SOURCES.

U.S. Patent Application Publication No. US20020168958 titled: SYSTEM AND METHOD FOR PROVIDING PERSONAL AND EMERGENCY SERVICE HAILING IN WIRELESS NETWORK.

U.S. Patent Application Publication No. US20020118118 titled: WIRELESS COMMUNICATION SYSTEM AND METHOD TO PROVIDE GEO-SPATIAL RELATED EVENT DATA.

U.S. Patent Application Publication No. US20020115445 titled: SYSTEM AND METHOD FOR LOCATING AN ALTERNATE COMMUNICATION MECHANISM IN CASE OF A FAILURE OF A WIRELESS COMMUNICATION DEVICE.

U.S. Patent Application Publication No. US20020102988 titled: WIRELESS COMMUNICATION SYSTEM AND METHOD FOR SORTING LOCATION RELATED INFORMATION.

Active RFID devices—so called radio tags—are known that transmit radio data and whose location can be determined. Alternate embodiments of the invention use such active radio tags. See, for example, Lionel M Ni, Yunhao Liu, Yiu Cho Lau, and Abhishek Patil, "LANDMARC: Indoor Location Sensing Using Active RFID", (PDF), ACM Wireless Networks, (WINET), Volume 10, Issue 6, November 2004, Pages 701-710. Ekahau Oy of Helsinki, Finland (U.S. company is Ekahau Inc., of Saratoga, Calif.) also markets an active RFID device that uses its above-mentioned Ekahau Positioning Engine, and one alternate embodiment uses such an RFID device.

Yet another embodiment uses the radiolocation method described in co-owned U.S. Provisional Patent Application Ser. No. 60/649,721 filed Feb. 3, 2005 to inventors Douglas et al., titled TAG LOCATION, CLIENT LOCATION, AND COVERAGE HOLE LOCATION IN A WIRELESS NETWORK, the contents of which are incorporated herein by reference.

Yet another embodiment uses a radiolocation method called "Near Field Electromagnetic Ranging" or simply NFER™, introduced commercially by Q-Track, Inc., Huntsville, Ala. See U.S. Patent Application Publications US 20050046608 titled NEAR FIELD ELECTROMAGNETIC POSITIONING SYSTEM AND METHOD and US 20040032363 titled SYSTEM AND METHOD FOR NEAR-FIELD ELECTROMAGNETIC RANGING, both to inventors Schantz, et al. The contents of both US 20050046608 and US 20040032363 are incorporated herein by reference. Briefly, US 20050046608 describes a system and method for electromagnetic position determination using a calibration process. For calibration, a transmitter is positioned at multiple locations in an area of interest and multiple receivers receive and record signal characteristics from the transmitter to generate a calibration data set. The unknown position of a transmitter, e.g., a transmitter placed on the mobile robot, may be determined by receiving signals from the mobile robot transmitter by multiple receivers. A locator data set is generated based on the comparison between two received signal characteristics determined for each receiver. The locator data set is compared with the calibration data set to determine the unknown position. In one version, the signal comparisons are the differences between electric and magnetic field phase. Further embodiments of the Q-track method use signal amplitude differences. A reciprocal method uses a single receiver, e.g., on the robot, and multiple transmitter locations.

A detailed bibliography of papers in the field of radiolocation, including radio-location in WLANs is available from BINARY Group, Division of Engineering, Brown University, Box D, Providence, R.I. 02912, and also for download on the Web as binary~dot~engin~dot~brown~dot~edu/publication/Positioning_Ref~dot~pdf downloaded Jul. 27, 2005) where "~dot~"represents a period in the actual URL.

Ultrasound-Based Location Determining

Figure 6:
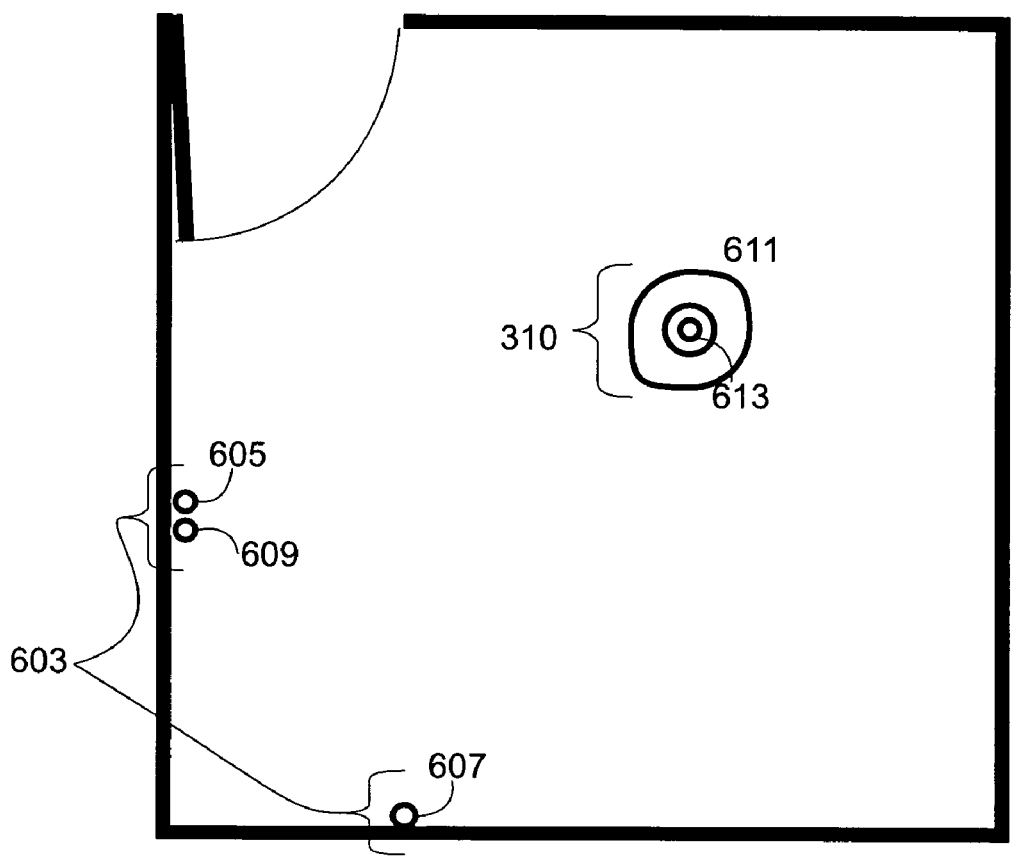
FIG. 6 shows an embodiment of a sensor array that is coupled to a processing system for determining the location of the mobile robot that has an ultrasonic transmitter and an infrared transmitter.

One embodiment of the robot of FIG. 3 includes a location determining system that includes a coordinate measuring system in the form of a sensor array located at a known position, e.g., against the wall at floor level in an area of interest and one or more transmitters located on the mobile robot. FIG. 6 shows a sensor array 603 that includes sensors 605, 607, and 609, and that is coupled to a processing system for determining the location. The mobile robot 310 is shown in simple form and in an exaggerated scale, has on it an ultrasonic transmitter 611 and an infrared transmitter 613. The sensor array picks up signals from the mobile robot's ultrasonic transmitter 611 and infrared transmitter 613. In one implementation, the sensor array 603 includes two ultrasonic sensors 605, 607 placed in known relation to each other and to the area of interest, and an infrared receiver 609. When the mobile robot's position determining system is activated, the infrared transmitter 613 transmits a set of pulses, and the ultrasound transmitter 611 simultaneously transmits a set of ultrasound pulses. These pulses all propagate, e.g., through the air above the floor surface. Each of the sensors picks up these pulses. The infrared pulses travel almost instantaneously and provide a timing base for the ultrasound sensors 605, 607. The ultrasound pulses travel to the respective sensors 605, 607, and the times of arrival are measured relative to the time of arrival of the infrared pulses as detected by the infrared receiver 609. The speed of sound is much less than the speed of electromagnetic radiation, e.g., the infrared, thus, the times of flight from the mobile robot 310 to each ultrasound sensor 605, 607 is proportional to the distance between the mobile robot 310 and each respective ultrasound sensor 605, 607. Triangulation leads to an indication of position.

While the above-described location determining system includes transmitters on the mobile robot and a sensor array located close to the floor, alternatively, the location determining system may include a receiver on the mobile robot that receives signals which are transmitted from one or more transmitters, that are, for example, located at known locations on the floor of the area of interest. In a configuration, the location determining system determines a position of the mobile robot relative to the active area based on the signals sent from the transmitters to the mobile robot.

In the cases where signals are transmitted between the mobile robot and one or more receivers or transmitters, the signals may be electromagnetic signals (e.g., light including infrared, laser, electrical, radar), acoustic signals (e.g., ultrasound), resonant signals, or any combination thereof or any other form of signal which would enable a system to determine a position of a writing implement relative to the active area, and in particular, the projected image.

One embodiment of the position determining system is based on a location determining system is described in U.S. Pat. No. 6,335,723 to Wood, et al. issued Jan. 1, 2002, titled "TRANSMITTER PEN LOCATION SYSTEM," incorporated herein by reference. The Wood, et al. system is designed for determining the position of a pen on a substantially flat surface such as a white board. How to modify the pen system to work on a mobile robot would be straight forward to one in the art. The pen-location transcription system of U.S. Pat. No. 6,335,723 uses a writing implement with a pointing tip that has multiple output elements, and is used to accurately determine the location of the pointing tip, in relation to the active area of a surface. The first output element, preferably an infrared transducer, transmits a first output signal from the writing implement. The second output element, preferably an ultrasonic transducer, transmits a second output signal, having a lower propagation velocity than the first output signal, from the writing implement to two or more sensors. Modifying the system means placing the transmitters on the mobile robot 310, and the sensors at known locations in the area of interest. In a basic embodiment, the first output signal arrives at one or more sensors approximately concurrently. The second output signal, having a speed of propagation different from the speed of propagation of the first signal, is transmitted from the mobile robot at a known time in relation to the first output signal, and arrives at each of the sensors at a time which is dependent on the velocity of the second signal and the distance between the mobile robot and the sensors. The location of the mobile robot is then determined by a sensor signal processor, by using the first signal as a boundary condition, by comparing the waveform of the second output signal to one or more stored prior second output signals to determine an accurate time of arrival, and by solving simultaneous equations. Alternative embodiments allow the transmission of supplementary information from mobile robot (or the writing implement in U.S. Pat. No. 6,335,723) to the sensors, using either the first and/or second output signals, such as user identification.

An improved embodiment of a pen-location transcription system that is readily modifiable to locating the mobile robot 310 is described in U.S. Pat. No. 6,414,673, also to Wood, et al. issued Jul. 2, 2002 and titled "Transmitter pen location system." U. S. Pat. No. 6,414,673 is incorporated herein by reference. The pen-location transcription system based on U.S. Pat. No. 6,414,673 uses a writing implement that is adapted to send a repeated output signal to external sensors at two or more sensor locations. Modifying for the mobile robot includes sending the same sort of repeated signal from the mobile robot. The location of mobile robot is determined in relation to the surface of a region of interest. In one embodiment an output element, preferably an ultrasonic transducer, transmits a time dependent output signal from a single signal transmitter on the mobile robot 310 to two or more external sensors at two or more sensor locations. The direction of arrival of the output signal to each of the sensor locations is determined, and the location of the mobile robot 310 is then determined as the intersection of direction vectors from the mobile robot 310 to the external sensors. In another embodiment, the transducer transmits a time dependent output signal from the transmitter, e.g., ultrasonic transmitter on the mobile robot 310 to three or more sensors in the sensor array, wherein the received signal is processed to determine the time of arrival to each of the sensors, and the location of the mobile robot 310 is determined as the calculated distance between the sensors. In another alternate embodiment having a dual signal transmitter on the mobile robot, a third sensor located at a third sensor location is used to determine the time of arrival of a secondary output signal, to determine the distance between the dual signal transmitter on the mobile robot 310 and the sensor location, while two or more sensors at the sensor location are used to determine the direction of arrival of the primary time dependent output signal. Alternative embodiments allow the transmission of supplementary information from the transmitter on the robot to the sensors, using waveshaping of the output signal.

The above patents also describe or refer to methods for calibrating the sensor array. By having the sensors of the sensor array be at known locations relative to each other and relative to the active area, one aspect of the invention includes automatic calibration.

Other embodiments of a pen-location transcription system also may be modified to determine the location of the mobile robot. One such alternate embodiment of adding a transcription system that includes a sensor array detecting signals from a transmitter that is on a writing implement, which would be modified to a transmitter on the mobile robot, is described in U.S. Pat. Nos. 6,266,051 and 6,456,280 to Holtzman titled "RETROFITTABLE APPARATUS FOR CONVERTING A SUBSTANTIALLY PLANAR SURFACE INTO AN ELECTRONIC DATA CAPTURE DEVICE" U.S. Pat. Nos. 6,266, 051 and 6,456,280 are incorporated herein by reference.

Other ultrasound-based location determining systems that are modifiable to determine the position of the mobile robot also are known that use various techniques to determine the position of a writing implement or stylus on a flat surface that can be adapted to be used in alternate embodiments of the invention. Examples of systems that use airborne ultrasound systems are described in U.S. Pat. No. 4,777,329 to Mallicoat, U.S. Pat. No. 4,814,552 to Stefik et al., U.S. Pat. No. 4,506, 354 to Hansen and U.S. Pat. No. 4,758,691 to De Bruyne. These systems employ various combinations of ultrasound transmitters and sensors arranged at two points fixed relative to a board and on a movable writing implement. Modifying them involves placing the components that were on the writing implement on the mobile robot, and scaling. The position of the movable element is then derived by triangulation. These systems typically require an additional link between the movable writing implement and a base unit, e.g., in the mobile device to provide timing information for time-of-flight ultrasound calculations.

Relative Position Determining

The above alternate embodiments use methods that determine the absolute location of the mobile robot 310 at points at which measurements are made. As an alternate to an absolute location determining system that determines the absolute location, alternate embodiments of the location determining system uses a relative location determining method that determines the location of the mobile robot relative to a known location. The known location is called the starting point. One embodiment uses one of the absolute location methods described above to determine the starting point, and then determines the location using a relative location determining system and the starting point location. Another embodiment uses a marked known location from which to start the robot's autonomous and automatic roaming and measuring.

Many relative location determining methods may be used. One embodiment that uses a robot that has wheels makes use of the number of wheel rotations and the respective direction of the rotations to determine the location relative to a starting point. One method, for example, uses the relative position determining method described in the above mentioned paper: Hills, A. and J. Schlegel, "Rollabout: A Wireless Design Tool," IEEE Communications, vol. 42, no. 2, pp. 132-138, February 2004. ; However, a mobile robot is used rather than the cart described in the Hills and Schlegel paper.

Other positioning device technologies also are known that can be used with the mobile robot system.

Pre-selected and Known Locations

In another embodiment, the locations of the mobile robot at which the measurements are obtained are pre-selected and known in advance of the measurements. The pre-selected locations, for example, may be the grid points of a rectangular grid pattern. One such embodiment does not require transmitting the determined location but rather at which of the pre-determined locations the robot is now in. With such a system, a complete location determining system need not actually determine and transmit to the site survey method the location, but rather just an indication. It might not be sufficient to remotely rely only on the order of transmission to know the location of the robot, e.g., assuming that the n'th measurement received indicates the n'th pre-determined, known location in a list because some measurements may not be received because of excessive path loss. Therefore, in such a method in which the locations pre-selected are known in advance of measurements, the location determining method determines the location by determining at which of the pre-selected locations the robot is located.

The selecting of the locations in one embodiment is carried out by a tool that overlays a floor map, on which are indicated the locations of already placed APs. The locations in the area at which measurements are to be made can now be graphically indicated by a user. In one embodiment, the WLAN manager has access to a stored set of floor maps. After measurement, including in the case of pre-selected locations, specification of the locations for measurements by the mobile robot system, radio measurement-related information obtained by measurement using the mobile robot may be used to create a overlay to the maps, e.g., an RSSI map, or a noise map etc on top of the 'site' map.

Obtaining Measurements Between an AP and a Client

One method embodiment of the invention operative in a wireless network includes providing a mobile robot as described above. The mobile robot is arranged in operation to traverse an area, and includes a first transceiver for the wireless network mounted thereon, the first transceiver, as described above, arranged in operation to communicate with a second transceiver to effect radio measurement operations including determining a measure indicative of the path loss between the first and second transceivers. The method further includes providing a location determining system, e.g., a system implementing one of the location determining methods described above with at least a component of the system is mounted on the robot and arranged in operation to determine the location of the first transceiver in the area. The method embodiment includes providing the part of the location determining system not mounted on the robot, and, for a plurality of locations in the area, carrying out the radio measurement operations.

In one version, the robot is arranged in operation to traverse each of the plurality of locations autonomously. In another version, the robot is controlled to traverse the area by a user e.g., using a remote control.

In one version, the locations at which radio measurements are effected are pre-selected, while in another embodiment, the plurality of locations are selected randomly, e.g., at pre-selected times as the robot traverses the area.

Multiple Mobile Robots to Obtain Client-to-Client Measurements

The method, system, and software described above are for obtaining signal strength, and hence path loss measurement between a transceiver, e.g., a station located at some unknown location and one or more other stations, e.g., APs located at known locations.

The method, system, and software is extendable to having a plurality of autonomous mobile robots such that signal strengths, and hence path loss measurements between a first transceiver on a first mobile robot at a first location, e.g., a station on the robot located at a first location and one or more other transceivers, e.g., other stations each on a respective mobile robot located at respective locations. By the robots each moving autonomously, a more thorough site survey in which none of the locations is restricted to known, e.g., known AP locations, is obtained.

Thus, by placing a WLAN card forming a first wireless station on a first mobile robot and using a location determining method to locate the first mobile robot, APs at known locations the first robot's first WLAN card can steadily communicate with one or more APs at known locations, thus providing AP-to-client path losses for a site survey. By having more than one such robot each robot with a respective WLAN card, and a location determining system to locate each robot, client-to-client path losses also are obtained.

Note that although the invention has been described in the context of a managed network, the invention is not restricted to such a context.

Further note that by the term robot as used herein is meant any self-propelled mobile platform that includes the radio transceiver and the at least a component of the location determining system, and that is designed to operate according to one or more of the inventive aspects described herein.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms. It should be appreciated that although the invention has been described in the context of the IEEE 802.11 standard, the invention is not limited to such contexts and may be utilized in various other applications and systems.

Furthermore, while the transceiver 380 embodiment for operation conforming to the IEEE 802.11 standard has been described, the invention may be embodied in transceivers conforming to other standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, WiMAX links, TDMA packet radios, low-cost point-to-point links, voice-over-IP portable "cell phones" (wireless Internet telephones), etc. In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities. In a similar manner, the term "processor" may refer to any device or portion of a device that processes electronic data from registers and/or memory to transform that electronic data into other electronic data that may be stored in registers and/or memory. A "computer" or a "computing machine" or a "computing platform" may include one or more processors.

The methodologies described herein are, in one embodiment, performable by a machine that includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system.

Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a mobile site-survey robot, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g. in a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, and/or volatile media. Non-volatile media includes, for example, optical, magnetic disks, and magneto-optical disks. Volatile media includes dynamic memory, such as main memory. For example, the term "carrier medium" shall accordingly be taken to include, but not be limited to, solid-state memories, optical media, and/or magnetic media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, bluetooth, GSM, PHS, CDMA, and other cellular wireless telephony standards.

Furthermore, the invention is not limited to any one type of network architecture and method of encapsulation, and thus may be utilized in conjunction with one or a combination of other network architectures/protocols. All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus comprising:
   a mobile robot arranged in operation to traverse an area, including traversing a first set of locations covering the area to perform a radio site survey;
   a first transceiver for a wireless network mounted on the robot and arranged in operation to communicate with a second transceiver to effect radio measurement operations for determining at each of the first set of locations a measure indicative of the path loss between the first and second transceivers; and
   a location determining system at least a component of which is mounted on the robot and arranged in operation to determine the location of the first transceiver at each of the first set of locations in the area.

2. An apparatus as recited in claim 1, wherein the mobile robot includes:
   a housing infrastructure including a chassis;
   a power subsystem arranged in operation to provide the energy to power the robot;
   a motive subsystem operative to propel the robot for radio measurement operations;
   a control module operative to control the robot to effect radio measurement operations via the first transceiver and the location determining system, the control module coupled to the first transceiver and to the at least a component of the location determining system that is mounted on the robot; and
   a sensor subsystem of one or more sensors coupled to the control module and operative in combination with the control module to navigate around a stationary object or obstacle encountered by the robot,
   wherein the control module is operative such that the mobile robot operates autonomously to autonomously traverse the first plurality of locations covering the area and to autonomously carry out the radio measurement operations for each of the plurality of locations, and wherein carrying out the radio measurement operations includes determining the locations of the plurality of locations using the location determining system.

3. An apparatus as recited in claim 2, wherein the locations of the first plurality of locations are pre-selected to traverse the area.

4. An apparatus as recited in claim 2, wherein the locations of the first plurality of locations are randomly selected to traverse the area.

5. An apparatus as recited in claim 1, wherein the first transceiver includes one or more antennas mounted on the mobile robot at a typical desktop or carrying height mounted on the robot.

6. An apparatus as recited in claim 1, wherein the mobile robot includes:
   a housing infrastructure including a chassis;
   a power subsystem arranged in operation to provide the energy to power the robot;
   a motive subsystem operative to propel the robot for radio measurement operations; and
   a control module operative to control the robot to effect radio measurement operations via the first transceiver and the location determining system, the control module coupled to the first transceiver and to the at least a component of the location determining system that is mounted on the robot,
   wherein the control module is operative such that an operator can remotely control the robot to traverse the first plurality of locations covering the area and carry out the radio measurement operations for each of the first plurality of locations, and wherein carrying out the radio measurement operations includes determining the locations of the first plurality of locations using the location determining system.

7. An apparatus as recited in claim 6, wherein the locations of the first plurality of locations are pre-selected to traverse the area.

8. An apparatus as recited in claim 7, wherein the first location determining system determines the location by determining at which of the pre-selected locations of the first plurality of locations the first mobile robot is located.

9. An apparatus as recited in claim 1, wherein the location determining system is one of the set consisting of:
   a system that uses radiolocation using time difference of arrival, a system that uses radiolocation using difference of arrival of radio signals between the mobile robot and a plurality of known locations, a system that uses radiolocation using path loss between the mobile robot and a plurality of known locations, a system that uses time of flight of ultrasound transmissions between the mobile robot and a plurality of known locations, and a system that uses a relative location determining method that determines the location of the mobile robot relative to a known location.

10. An apparatus as recited in claim 1, wherein the wireless network substantially conforms to the IEEE 802.11 standard.

11. An apparatus as recited in claim 1, wherein the first and second transceivers are a first wireless station and a second wireless station respectively, each arranged in operation to operate in the wireless network, and wherein one of the first wireless station or the second wireless station is an access point of the wireless network.

12. An apparatus as recited in claim 1, wherein the locations of the first set of locations are pre-selected to traverse the area.

13. A method operative in a wireless network, the method comprising:

operating a first mobile robot to traverse an area, including traversing a first plurality of locations covering the area to carry out a radio site survey of the area, wherein the first mobile robot includes:

a first transceiver mounted the first mobile robot, the first transceiver being for the wireless network and arranged in operation to communicate with a second transceiver to effect radio measurement operations for determining at each of the first plurality of locations a measure indicative of the path loss between the first and second transceivers; and at least a component of a first location determining system that includes the component, the first location determining system further including one or more other components not mounted on the first mobile robot, the first location determining system being arranged in operation to determine the location of the first transceiver in the area; and carrying out the radio measurement operations, including carrying out one or more of the radio measurement operations at each of the locations of the first plurality, wherein carrying out the radio site survey includes using the first location determining system to determine the location of each of the first plurality of locations.

14. A method as recited in claim 13, wherein the first mobile robot is an autonomous robot that includes:

a housing infrastructure including a chassis;

a power subsystem arranged in operation to provide the energy to power the first mobile robot;

a motive subsystem operative to propel the first mobile robot for radio measurement operations;

a control module operative to control the first mobile robot to effect radio measurement operations via the first transceiver and the first location determining system, the control module coupled to the first transceiver and to the at least a component of the first location determining system that is mounted on the first mobile robot; and a sensor subsystem of one or more sensors coupled to the control module and operative in combination with the control module to navigate around a stationary object or obstacle encountered by the first mobile robot, and wherein the carrying out the radio measurement operations for the first plurality of locations includes the first mobile robot autonomously traversing the first plurality of locations covering the area and autonomously carrying out the radio measurement operations for each of the first plurality of locations.

15. A method as recited in claim 13, wherein the first mobile robot includes:

a housing infrastructure including a chassis;

a power subsystem arranged in operation to provide the energy to power the first mobile robot;

a motive subsystem operative to propel the first mobile robot for radio measurement operations; and a control module operative to control the first mobile robot to effect radio measurement operations via the first transceiver and the first location determining system, the control module coupled to the first transceiver and to the at least a component of the first location determining system that is mounted on the first mobile robot, wherein the carrying out the radio measurement operations for the first plurality of locations includes an operator remotely controlling the first mobile robot to traverse the first plurality of locations covering the area and to carry out the radio measurement operations for each of the first plurality of locations.

16. A method as recited in claim 13, further comprising:

operating a second mobile robot to traverse the area, the second mobile robot including the second transceiver mounted thereon, the second mobile robot further including at least a component of a second location determining system that includes the component and one or more other components not mounted on the second mobile robot, the second location determining system arranged in operation to determine the location of the second transceiver in the area; and causing the second mobile robot to traverse a second plurality of locations in the area, such that each radio measurement is between the first transceiver on the first mobile robot at one of the first plurality of locations and the second transceiver on the second robot at one of the second plurality of locations, wherein the carrying out the radio measurement operations for each of the first plurality of locations further includes using the second location determining system to determine each unknown one of the second plurality of locations at which the second mobile robot is located for the radio measurement operation.

17. A method as recited in claim 13, wherein the first location determining system is one of the set consisting of:

a system that uses radiolocation using time difference of arrival, a system that uses radiolocation using difference of arrival of radio signals between the first mobile robot and a plurality of known locations, a system that uses radiolocation using path loss between the first mobile robot and a plurality of known locations, a system that uses time of flight of ultrasound transmissions between the first mobile robot and a plurality of known locations, and a system that uses a relative location determining method that determines the location of the first mobile robot relative to a known location.

18. A method as recited in claim 13, wherein the locations of the first plurality of locations are pre-selected to traverse the area.

19. A method as recited in claim 13, wherein the locations of the first plurality of locations are randomly selected to traverse the area.

20. A method as recited in claim 18, wherein the first location determining system determines the location by determining at which of the pre-selected locations of the first plurality of locations the first mobile robot is located.

21. A method as recited in claim 13, wherein the wireless network substantially conforms to the IEEE 802.11 standard, wherein the first and second transceivers are a first wireless station and a second wireless station respectively, each arranged in operation to operate in the wireless network.

22. A method as recited in claim 13, wherein the first and second transceivers are a first wireless station and a second wireless station respectively, each arranged in operation to operate in the wireless network, and wherein one of the first wireless station or the second wireless station is an access point of the wireless network.

23. An apparatus operative in a wireless network, the apparatus comprising:
   a first mobile robot means arranged in operation to traverse an area including traversing a plurality of locations covering the area for carrying out a radio site survey, the first mobile robot means including a first transceiver mounted on the first mobile robot means arranged in operation to communicate with a second transceiver to effect radio measurement operations for determining at each of the plurality of locations a measure indicative of the path loss between the first and second transceivers;
   the first mobile robot means further including at least part of means for determining the location at each of the first set of locations of the first transceiver in the area.

24. An apparatus as recited in claim 23, wherein the first mobile robot means includes:
   means for housing;
   means for providing energy to power the first mobile robot means;
   means for propelling the first mobile robot for radio measurement operations;
   means for control of the first mobile robot to effect radio measurement operations via the first transceiver and the means for determining the location, the control module coupled to the first transceiver and to the at least a component of the location determining system that is mounted on the first mobile robot; and
   a sensor subsystem of one or more sensors coupled to the control module and operative in combination with the control module to navigate around a stationary object or obstacle encountered by the first mobile robot, and
   wherein the effecting of the radio measurement operations for the plurality of locations includes the first mobile robot autonomously traversing the set of locations covering the area and autonomously carrying out the radio measurement operations for the plurality of locations.

25. A computer readable medium on which is encoded computer readable code that when executed by one or more processors cause carrying out of a method comprising:
   causing a first mobile robot to traverse a first plurality of locations covering an area for carrying out a radio site survey, the first mobile robot including a first transceiver mounted thereon, the first transceiver being for the wireless network and arranged in operation to communicate with a second transceiver to effect radio measurement operations for determining at each of the first plurality a measure indicative of the path loss between the first and second transceivers; the first mobile robot further including at least a component of a location determining system arranged in operation to determine the location of the first transceiver in each of the first plurality of locations in the area, wherein the traversing of the first plurality of locations includes:
      at each location of the first plurality, carrying out the radio measurement operations, including using the location determining system to determine the location of each of the first plurality of locations.

26. A computer readable medium as recited in claim 25, wherein the first mobile robot is an autonomous robot that includes:
   a housing infrastructure including a chassis;
   a power subsystem arranged in operation to provide the energy to power the first mobile robot;
   a motive subsystem operative to propel the first mobile robot for radio measurement operations;
   a control module operative to control the first mobile robot to effect radio measurement operations via the first transceiver and the first location determining system, the control module coupled to the first transceiver and to the at least a component of the first location determining system that is mounted on the first mobile robot; and
   a sensor subsystem of one or more sensors coupled to the control module and operative in combination with the control module to navigate around a stationary object or obstacle encountered by the first mobile robot, and
   such that the traversing of the first plurality of locations is carried out autonomously by the robot,
   wherein the carrying out the radio measurement operations for each of the first plurality of locations includes the first mobile robot autonomously carrying out the radio measurement operations for the first plurality of locations.

27. A computer readable medium as recited in claim 25, wherein the first mobile robot includes:
   a housing infrastructure including a chassis;
   a power subsystem arranged in operation to provide the energy to power the first mobile robot;
   a motive subsystem operative to propel the first mobile robot for radio measurement operations; and
   a control module operative to control the first mobile robot to effect radio measurement operations via the first transceiver and the first location determining system, the control module coupled to the first transceiver and to the at least a component of the first location determining system that is mounted on the first mobile robot,
   wherein the traversing of the first plurality of locations includes an operator remotely controlling the first mobile robot to traverse the first plurality of locations covering the area and carrying out the radio measurements.

28. A computer readable medium as recited in claim 25, wherein the first location determining system is one of the set consisting of:
   a system that uses radiolocation using time difference of arrival,
   a system that uses radiolocation using difference of arrival of radio signals between the first mobile robot and a plurality of known locations,
   a system that uses radiolocation using path loss between the first mobile robot and a plurality of known locations,
   a system that uses time of flight of ultrasound transmissions between the first mobile robot and a plurality of known locations, and
   a system that uses a relative location determining method that determines the location of the first mobile robot relative to a known location.

29. A computer readable medium as recited in claim 25, wherein the wireless network substantially conforms to the IEEE 802.11 standard, wherein the first and second transceivers are a first wireless station and a second wireless station respectively, each arranged in operation to operate in the wireless network.

30. A computer readable medium as recited in claim 25, wherein the first and second transceivers are a first wireless station and a second wireless station respectively, each arranged in operation to operate in the wireless network, and wherein one of the first wireless station or the second wireless station is an access point of the wireless network.

* * * * *

UNITED STATES PATENT AND TRADEMARK OFFICE
CERTIFICATE OF CORRECTION

| | |
|---|---|
| PATENT NO. | : 7,456,596 B2 |
| APPLICATION NO. | : 11/208091 |
| DATED | : November 25, 2008 |
| INVENTOR(S) | : Goodall et al. |

It is certified that error appears in the above-identified patent and that said Letters Patent is hereby corrected as shown below:

In column 33, line 29, kindly insert --on-- between "mounted" and "the"

Signed and Sealed this

Thirty-first Day of March, 2009

JOHN DOLL
*Acting Director of the United States Patent and Trademark Office*